(12) United States Patent
Costa Requena et al.

(10) Patent No.: US 7,480,915 B2
(45) Date of Patent: *Jan. 20, 2009

(54) WV-IMS RELAY AND INTEROPERABILITY METHODS

(75) Inventors: Jose Costa Requena, Helsinki (FI); Inmaculada Espigares, Helsinki (FI)

(73) Assignee: Nokia Corporation, Espoo (FI)

( * ) Notice: Subject to any disclaimer, the term of this patent is extended or adjusted under 35 U.S.C. 154(b) by 320 days.

This patent is subject to a terminal disclaimer.

(21) Appl. No.: 10/265,650

(22) Filed: Oct. 3, 2002

(65) Prior Publication Data

US 2004/0068574 A1 Apr. 8, 2004

(51) Int. Cl.
*G06F 13/00* (2006.01)

(52) U.S. Cl. .................. 719/311; 719/313; 719/318; 709/230

(58) Field of Classification Search ................ 709/230; 719/318, 313, 311
See application file for complete search history.

(56) References Cited

U.S. PATENT DOCUMENTS

| | | | |
|---|---|---|---|
| 5,175,817 A | 12/1992 | Adams et al. | |
| 5,771,275 A * | 6/1998 | Brunner et al. | 370/385 |
| 5,812,768 A | 9/1998 | Pagé et al. | 395/200.09 |
| 5,894,478 A * | 4/1999 | Barzegar et al. | 370/401 |
| 6,038,603 A | 3/2000 | Joseph | |
| 6,222,855 B1 | 4/2001 | Kimber et al. | 370/466 |
| 6,253,248 B1 | 6/2001 | Nakai et al. | |
| 6,282,281 B1 | 8/2001 | Low | |
| 6,282,579 B1 | 8/2001 | Carre | |
| 6,405,254 B1 | 6/2002 | Hadland | 709/230 |
| 6,470,010 B1 | 10/2002 | Szviatovszki et al. | |
| 6,625,141 B1 | 9/2003 | Glitho et al. | |
| 6,658,251 B1 * | 12/2003 | Lee et al. | 455/435.1 |
| 6,683,881 B1 | 1/2004 | Mijares et al. | |
| 6,704,396 B2 | 3/2004 | Parolkar et al. | |
| 6,741,610 B1 * | 5/2004 | Volftsun et al. | 370/466 |
| 6,757,732 B1 | 6/2004 | Sollee et al. | |

(Continued)

OTHER PUBLICATIONS

"Wireless Village—The Mobile IMPS Initiative; System Architecture Model" v 1.1, 2001-2002 Ericsson, Motorola and Nokia.

(Continued)

*Primary Examiner*—Andy Ho
(74) *Attorney, Agent, or Firm*—Nokia Corporation

(57) ABSTRACT

Mapping functionality is added in between a Wireless Village (WV) server and a Presence, Messaging and Group (PMG) server of a 3GPP IP (Internet Protocol) Multimedia Subsystem (IMS) to permit interoperability between WV and IMS clients for instant messaging and presence services for operators who have deployed both IMS and WV. Due to the possibility that an operator may have deployed WV but not IMS and due to the use of a Client-to-Server Protocol (CSP) between WV clients and WV servers and the use of a Server-to-Server Protocol (SSP) between WV servers, the mapping functionality is structured to permit an IMS device to register into WV system via an IMS/WV Relay that performs an SIP/CSP conversion to emulate a WV device login but to then use the SSP to maintain a session or to deliver a message or presence information. Likewise, a WV device can register directly into IMS for operators not deploying WV using the mapping functionality of the present invention, e.g., in an IMS/WV Relay.

16 Claims, 24 Drawing Sheets

U.S. PATENT DOCUMENTS

| | | | |
|---|---|---|---|
| 6,820,133 B1* | 11/2004 | Grove et al. | 709/238 |
| 6,842,774 B1* | 1/2005 | Piccioni | 709/207 |
| 6,988,143 B2 | 1/2006 | O'Neill et al. | |
| 7,194,558 B2* | 3/2007 | Kawamoto et al. | 709/249 |
| 2002/0120671 A1* | 8/2002 | Daffner et al. | 709/201 |
| 2002/0181497 A1* | 12/2002 | Mano et al. | 370/466 |
| 2003/0076815 A1 | 4/2003 | Miller et al. | |
| 2003/0148756 A1* | 8/2003 | Onishi et al. | 455/414 |
| 2004/0037406 A1 | 2/2004 | Gourraud | |

OTHER PUBLICATIONS

"Wireless Village—The Mobile IMPS Initiative; Features and Functions" v1.1, 2001-2002, Ericcson, Motorola and Nokia.

"Wireless Village—The Mobile IMPS Initiative; Client-Server Protocol Transport Bindings" v 1.1, 2001-2002 Ericsson, Motorola and Nokia.

"Wireless Village—The Mobile IMPS Initiative; Server-Server Protocol XML Syntax Document" v 1.1, 2001-2002 Ericsson, Motorola and Nokia.

"Wireless Village—The Mobile IMPS Initiative; Client-Server Protocol DTD and Examples" v 1.1, 2001-2002 Ericsson, Morotola and Nokia.

3 GPP TS 29.228 v5.1.0 (Sep. 2002); 3rd Generation Partnership Project; Technical Specification Group Core Network; IP Multimedia (IM) Subsystem Cx and Dx Interfaces; Signalling Flows and Messaage Contents (Release 5).

"Wireless Village—The Mobile IMPS Initiative; SSP—Server to Server Protocol Semantics Document" v 1.1 2001-2002, Ericsson, Motorola and Nokia.

"Wireless Village—The Mobile IMPS Initiative; Client-Server Protocol Session and Transactions" v 1.1, 2001-2002, Ericsson, Motorola and Nokia.

"ENUM Usage Scenarios", S. Lind, Internet Draft draft-ietf-enum-usage-scenatios-00.txt, Jun. 6, 2002.

RFC 2778, "A Model for Presence and Instant Messaging", M. Day et al, Feb. 2000.

H. Sinnreich et al, "Internet Communications Using SIP—Delivering VoIP and Multimedia Services with Session Initiation Protocol", John Wiley & Sons, New York, 2001, pp. 21-22.

"Interworking Between SIP/SDP and H.323", Kundan Singh et al; Department of Computer Science, Columbia University, New York, USA; IPTEL 2000.

T. Berners-Lee, L. Masinter, M. McCahill, Uniform Resource Locators (URL). RFC 1738. Dec. 1994.

M. Handley, H. Schulzrinne, E. Schooler, J. Rosenberg. SIP: Session Initiation Protocol. RFC 2543. Mar. 1999.

* cited by examiner

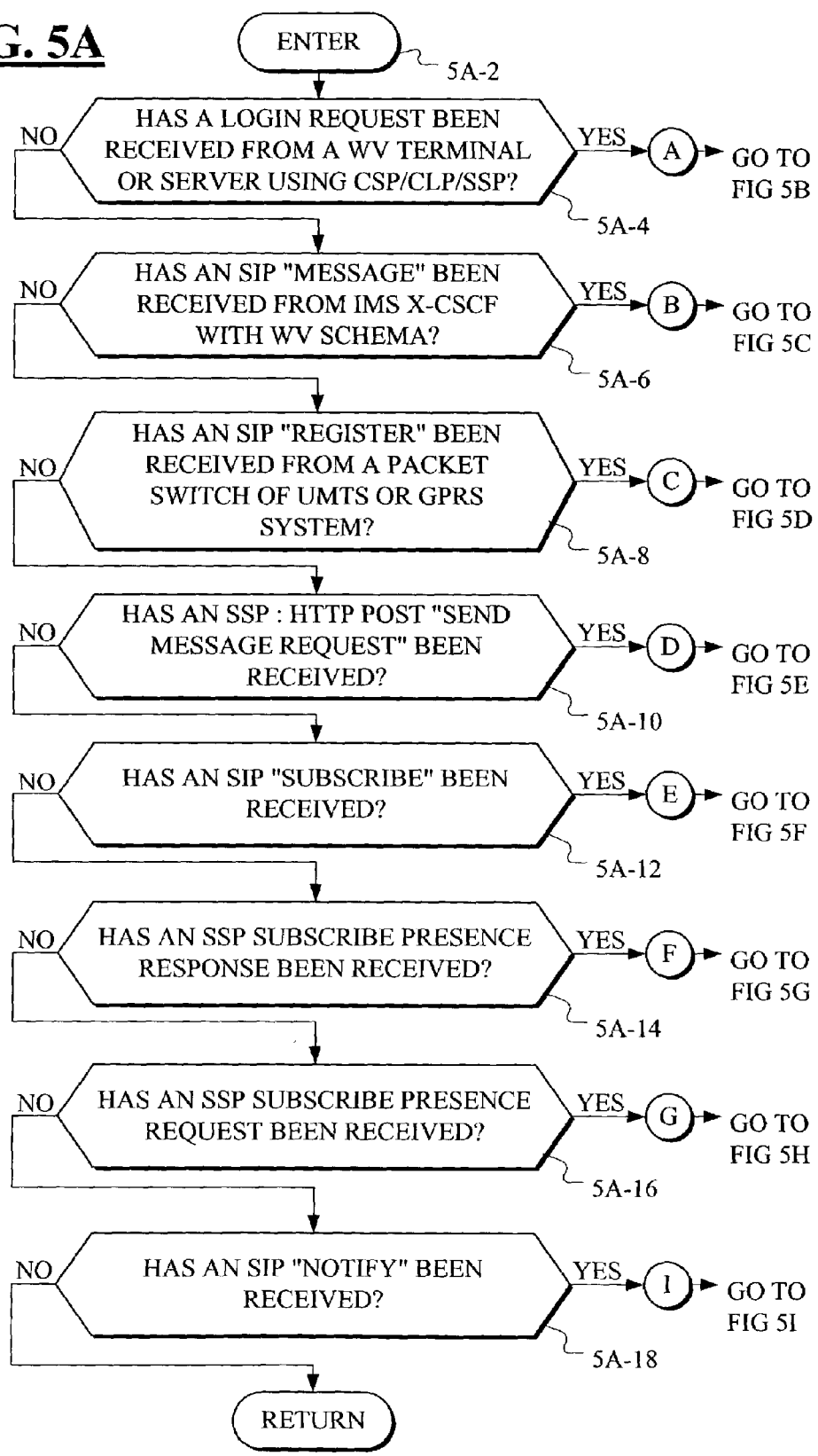

WV-IMS RELAY AND INTEROPERABILITY METHODS

BACKGROUND OF THE INVENTION

1. Technical Field of the Invention

The present invention relates to interoperability between end-user devices designed for use in similar but different kinds of telecommunications systems where the system infrastructure for one system is not necessarily deployed and, more particularly, between a first system that primarily uses a single protocol throughout and a second system that uses different protocols between its servers and between its servers and its devices.

2. Discussion of Related Art

Such a first system is exemplified by an Internet Protocol Multimedia Subsystem (IMS) according to the third generation partnership project (3GPP) while such a second system is exemplified by a Wireless Village (WV) system of the Instant Messaging and Presence Services (IMPS) Initiative. Therefore, an exemplary but non-limiting application of the present invention enables WV clients to interoperate with IMS clients.

FIG. 1 shows a prior art Wireless Village system architecture model. According to the Wireless Village "System Architecture Model version 1.1", it is a client-server based system, where the server is an IMPS server and the clients can be either mobile terminals, or other services/applications for fixed PC-clients. For interoperability, the IMPS servers and gateways are connected by a server-to-server protocol (SSP) defined in various WV specifications now published at version 1.1, which may be found at www.wireless-village.com. For instance, FIG. 1 shows a first Wireless Village server 10 communicating using the SSP with a second Wireless Village server 14. Likewise, the first and second Wireless Village servers 10, 14 are able to communicate using the SSP over communication lines 16, 18 with a Proprietary Gateway 20. Each of the Wireless Village servers 10, 14 constitute central nodes in the Wireless Village system. As shown in FIG. 1, a WV server 10, 14 comprises application service elements 22 that are accessible via service access points (SAPs) 24, 26 in the servers 10, 14.

As shown in FIG. 2, the application service elements comprise a presence service element 28, an instant messaging element 30, a group service element 32, and a content service element 34. The functional description of each of these application service elements may be found in the above-mentioned Wireless Village specification entitled, "System Architecture Model, version 1.1". Similarly, as shown in FIG. 2, a service access point (SAP). 35 serves as the interface between the WV server and its environment. It has interfaces to WV clients, other WV servers, the mobile core network, and proprietary gateways to non-WV servers. Such a proprietary, non-WV server 36 is shown in FIG. 1 coupled to the proprietary gateway 20 by a signal line 38.

The functionality of such a Service Access Point 35, as shown in FIG. 2, includes authentication and authorization for communicating with Wireless Village embedded clients 40, 42, 44 (see FIG. 1) using a client-server protocol (CSP) access 39 also defined in the Wireless Village specifications, version 1.1. The SAP 35 also includes Service Discovery and Service Agreement functionality for CLP (command line protocol) access 46 to command line interface (CLI) clients 48, 50, 52 (FIG. 1). The command line interface client uses text messages to communicate with the WV server. The functionality provided by such a client might be a subset of the functionality provided by an embedded client 40, 42, 44. An example of a CLI client is a mobile terminal that uses SMS to communicate with the Wireless Village server.

User profile management is another functionality provided in the Service Access Point 35, as shown in FIG. 2, in providing SMCNP (Server Mobile Core Network Protocol) access 54 to a mobile core network 56 (FIG. 1). Finally, a Service Relay function is provided by SSP access 58 in order to route all service requests and responses among the servers through the server-to-server protocol (SSP).

The SSP service relay is discussed further in the Wireless Village specification entitled "Features and Functions, version 1.1", as also shown in FIG. 3 hereof. According to the WV specification, Home Domains such as Home Domain A 64 and Home Domain B 66 must have a direct SSP connection to interoperate with each other so that client A connected to Home Domain A 64 can communicate with the services offered by the Wireless Village network, which may include accessing information of client B 70 connected to Home Domain B 66. However, Wireless Village also supports the routing of "service relay" between the home domain and a Primary Service Element (PSE), meaning a primary SE of an IMPS service for a client. In other words, PSE may be in the home domain of the client or in a remote domain.

For example, the upstream route from Home Domain B 66 to a PSE 72 for a particular client is shown in FIG. 3, where the PSE domain 72 that provides the actual service element, e.g., an instant messaging (IM) service, is shown remotely. Each intermediate domain relays the service request to the next node. The intermediate nodes (H(1) WVS, . . . , H(n) WVS) act as the "logical" service provider role for each downstream domain, and act as the "logical" service requester role for each upstream domain, as suggested in FIG. 3.

At each domain, the SAP should maintain a service table that keeps track of the service agreements to appropriately relay the SSP service request on a per-service basis and forward the SSP service result on a per-domain basis. Being the "logical" service provider, the SAP should maintain a session record for each service requester. Being the "logical" service requester, the SAP should maintain a transaction record for each service provider. The SAP should maintain a transaction table to map each requested transaction from its service requester of the initiated transaction to its service provider. The transaction table should have a unique match for each transaction. Therefore, the service relay flow and result forward flow at each SAP is clearly and uniquely identified by the transaction flows.

The SAP at the home domain should appropriately map a CSP/CLP service request from the client to an SSP service request and/or map the SSP service result to a CSP/CLP service result for the client.

This defined interoperability as per the Wireless Village specifications is satisfactory as far as it goes, but the interface between the proprietary gateway 20 and the proprietary server 36 is not well defined. It should preferably employ a non-proprietary solution for interfacing on the line 38 between the proprietary instant messaging or presence service server 36 and the proprietary Wireless Village gateway 20. In certain cases, such as the IMS (IP Multimedia Subsystem) proposed in UMTS Release-5, the addressing modes are completely different, in that the IMS takes an SIP (session initiation protocol) communication protocol approach, and IMS also uses http (hypertext transfer protocol) as transport protocol for certain services (i.e. HTTP probably with SOAP utilised for group management, access control manipulation, etc), while Wireless Village uses transport protocols that are different (WSP, http, https). So it would appear to require to have an interoperability functionality to change the semantics of the messages.

WV Messages are defined in XML scripts with HTTP as transport. See "SSP-Transport binding," version 1.1 "Client-Server Protocol Transport Bindings," version 1.1, "Server-Server Protocol XML Syntax Document," version 1.1, "Client-Server Protocol DTD and Examples" version 1.1 of the Wireless Village Mobile IMPS Initiative. In IMS the transport can be either SIP or HTTP and the normal procedures performed according to WV specifications are different. The WV XML scripts are self contained data structures that include session and transaction information. In IMS this functionality is partly performed by the transport protocol and the rest is included in the body of the messages.

Moreover, as mentioned above, the IMS according to 3GPP primarily uses a single protocol (SIP) that is standardized by the IETF and the WV servers use two protocols as also described above, i.e., SSP and CSP/CLP. To compound the problem, there may be some operators who deploy the IMS but not the WV, and other operators who deploy the WV but not the IMS but nonetheless wish to offer their customers access to the other service.

DISCLOSURE OF INVENTION

An object of the present invention is to provide functionality with the ability to perform interoperability between systems utilizing different addressing modes for presence, messaging, chat and related content delivery type services.

Another object of the present invention is to provide interoperability functionality to a second service for subscribers of a second service.

According to a first aspect of the present invention, a method for interoperating between devices designed for use in different networks including a first network of said different networks having a first server for communicating with a first device designed for use in said first network using a first protocol said different networks including a second network having a second server for communicating with another server in said second network using a second protocol and with a second device designed for use in said second network using a third protocol, comprising the steps of converting to said third protocol a register signal received according to said first protocol from said first server or from said first device without using said first server, for registering said first device of said first network in said second network, and converting to said first protocol a message request signal received according to said second protocol from said second server in communication according to said third protocol with said second device for transmission of said message request signal according to said first protocol to said first server and onward to said first device or to said first device without using said first server.

In further accord with the first aspect of the invention, the method further comprises the steps of converting a log in signal received from said second server according to said second protocol to said first protocol for registering said second device designed for use in said second network in said first network, and converting to said second protocol a message request signal received according to said first protocol from said first server in communication according to said first protocol with said first device for transmission of said message request signal according to said second protocol to said second server for conversion to said third protocol at said second server for transmission of said message request to said second device according to said third protocol. In addition, the method may further comprise the steps of converting a presence request signal received according to said first protocol from said first server to said second protocol for requesting presence information of said second device from said second server according to a subscription to said presence information of said second device subscribed by said first device, and converting a presence information signal according to said second protocol indicative of said presence information of said second device and received from said second server to said first protocol for transmission to said first server and onward to said first device.

In still further accord with the first aspect of the present invention, the method further comprises the steps of converting a register signal received from said second server according to said second protocol to said first protocol for registering said second device of said second network in said first network, converting a presence request signal received according to said second protocol from said second server to said first protocol for requesting presence information of said first device from said first server according to a subscription to said presence information of said first device subscribed by said second device, and converting a presence information signal according to said first protocol indicative of said presence information of said first device and received from said first server to said second protocol for transmission to said second server for conversion to said third protocol at said second server for transmission to said second device.

According to a second aspect of the present invention, a method for interoperating between devices designed for use in different networks including a first network of said different networks having a first server for communicating with a first device designed for use in said first network using a first protocol, said different networks including a second network having a second server for communicating with another server in said second network using a second protocol and with a second device designed for use in said second network using a third protocol, comprises the steps of converting to said first protocol a register signal received from said second server according to said second protocol or from said second device according to said third protocol without using said second server for registering said second device in said first network, and converting to said third protocol a message request signal received according to said first protocol from said first server for transmission to said second device or converting said message request signal to said second protocol for transmission of said message request signal according to said second protocol to said second server for conversion to said third protocol at said second server for transmission of said message request signal to said second device according to said third protocol.

According to a third aspect of the present invention, a method for interoperating between devices designed for use in different networks including a first network of said different networks having a first server for communicating with a first device designed for use in said first network using a first protocol, said different networks including a second network having a second server for communicating with another server in said second network using a second protocol and with a second device designed for use in said second network using a third protocol, comprises the steps of converting to said first protocol a register signal received from said second server according to said second protocol or from said second device according to said third protocol without using said second server for registering said second device in said first network, converting a presence request signal received according to said first protocol from said first server to said second protocol for requesting presence information of said second device from said second server or to said third protocol for requesting presence information of said second device according to a subscription to said presence information of said second device subscribed by said first device, and converting to said first protocol a presence information signal according to said second protocol indicative of said presence information of said second device and received from said second server or according to said third protocol indicative of said presence information of said second device and received from said second device for transmission to said first server and onward to said first device.

According to a fourth aspect of the present invention, a method for interoperating between separate networks including a first server of a first network for communicating with a first device in said first network using a first protocol and including a second server of a second network for communicating with another server in said second network using a second protocol and with a second device of said second network using a third protocol, comprises the steps of converting to said first protocol a register signal received from said second server according to said second protocol or from said second device according to said third protocol without using said second server for registering said second device designed for use in said second network in said first network, converting to said first protocol a presence request signal received according to said second protocol from said second server or received according to said third protocol from said second device for requesting presence information of said first device from said first server according to a subscription to said presence information of said first device subscribed by said second device, and converting to said third protocol a presence information signal received according to said first protocol from said first server indicative of said presence information of said first device to said third protocol for transmission to said second device or converting said presence information signal to said second protocol for transmission to said second server for conversion to said third protocol at said second server for transmission to said second device.

According to a fifth aspect of the present invention, a device for facilitating interoperability between devices designed for use in different networks, comprises a first converter, responsive to an incoming first register or login signal from a first device in a first network of said different networks, said register or login signal formatted according to a first protocol and also responsive to a first control signal, for providing a first converted signal according to a second protocol for registering or logging said first device of said first network in a second network, and a control, responsive to said incoming first register or login signal, for providing said first control signal. The device may further comprise a second converter, responsive to an incoming message request signal received according to said second protocol from a second device and responsive to a second control signal, for providing a converted message request signal according to said first protocol for transmission of said message request signal according to said first protocol to said first device, wherein said control is responsive to said incoming message request signal, for providing said second control signal.

Further, the second converter may be responsive to a second register or login signal received from a server of said second network according to said second protocol and be responsive to said second control signal from said control, for converting said second register or login signal received from said server to a second register or login signal according to said first protocol for registering said second device of said second network in said first network, wherein said control may be responsive to said second register or login signal for providing said second control signal and wherein said server of said second network may be in communication with said second device either via another server or directly. The first converter may be responsive to an incoming second message request signal received according to said first protocol from a server of said first network in communication according to said first protocol with said first device and responsive to said first control signal, for converting said second message request signal received according to said first protocol to an outgoing second message request signal according to said second protocol for transmission to said server of said second network for conversion to said third protocol at said second server for transmission to said second device, wherein said control is responsive to said incoming second message request signal, for providing said first control signal. The first converter may be responsive to a presence request signal received according to said first protocol from said server of said first network and to said first control signal, for converting said presence request signal to said second protocol for requesting presence information of said second device from said server of said second network according to a subscription to said presence information of said second device subscribed by said first device. The second converter may be responsive to a presence information signal according to said second protocol indicative of presence information of said second device and received from said server of said second network and be responsive to said second control signal provided by said control in response to said presence information signal according to said second protocol for conversion to said first protocol for transmission to said server of said first network and onward to said first device.

Or, the second converter may be responsive to a register or login signal received from said server of said second network according to said second protocol and be responsive to said second control signal from said control, for converting said register or login signal received from said server of said second network to a register signal according to said first protocol for registering said second device of said second network in said first network, wherein said control may be responsive to said register or login signal for providing said second control signal.

Still further, said first converter may be responsive to a presence request signal received according to said second protocol from said server of said second network and to said first control signal for converting said presence request signal received according to said second protocol from said server of said second network to said first protocol for requesting presence information of said first device from said server of said first network, according to a subscription to said presence information of said first device subscribed by said second device, wherein said control is responsive to said presence request signal for providing said first control signal. The first converter may be responsive to a presence information signal according to the first protocol indicative of said presence information of said first device and received from said server of said first network and responsive to said first control signal, for converting said presence information signal received from said server of said first network to said second protocol for transmission to said server of said second network for conversion to said third protocol at said server of said second network for transmission to said second device, wherein said control may be responsive to said presence information signal for providing said first control signal.

According to a sixth aspect of the present invention, a device for interoperating between separate networks including a first server of a first network for communicating with a first device in said first network using a first protocol and including a second server of a second network for communicating with another server in said second network using a second protocol and with a second device of said second network using a third protocol, comprises means for converting a login request signal received from said second server according to said second protocol to said first protocol for registering said second device of said second network in said first network, and means for converting to said second protocol a message request signal received according to said first protocol from said first server in communication according to said first protocol with said first device for transmission of said message request signal according to said second protocol to said second server for conversion to said third protocol at said second server for transmission of said message request to said second device according to said third protocol.

According to a seventh aspect of the present invention, a device for interoperating between separate networks including a first server of a first network for communicating with a first device in said first network using a first protocol and including a second server of a second network for communicating with another server in said second network using a second protocol and with a second device of said second network using a third protocol, comprises means for converting a login request signal received from said second server according to said second protocol to said first protocol for registering said second device of said second network in said first network, means for converting a presence request signal received according to said first protocol from said first server to said second protocol for requesting presence information of said second device from said second server according to a subscription to said presence information of said second device subscribed by said first device, and means for converting a presence information signal according to said second protocol indicative of said presence information of said second device and received from said second server to said first protocol for transmission to said first server and onward to said first device.

According to an eighth aspect of the present invention, a device for interoperating between separate networks including a first server of a first network for communicating with a first device in said first network using a first protocol and including a second server of a second network for communicating with another server in said second network using a second protocol and with a second device of said second network using a third protocol, comprises means for converting a login request signal received from said second server according to said second protocol to said first protocol for registering said second device of said second network in said first network, means for converting a presence request signal received according to said second protocol from said second server to said first protocol for requesting presence information of said first device from said first server according to a subscription to said presence information of said first device subscribed by said second device, and means for converting a presence information signal according to said first protocol indicative of said presence information of said first device and received from said first server to said second protocol for transmission to said second server for conversion to said third protocol at said second server for transmission to said second device.

The invention defines functionality for use in a device such as a Proprietary Server, a Proprietary Gateway, a Service Access Point (SAP), or the like, found in IMS, Wireless Village or similar systems. It provides the ability to interoperate between clients using similar services but employing different protocols and addressing techniques. The idea is to include, e.g., a server or a service relay that receives messages from IMS and maps them into equivalent Wireless Village transactions and vice versa. The server or relay should handle features such as security, login procedure, capability negotiation and other presence and messaging services between different systems. Thus, for example, the WV-IMS server or relay has to split the functionality performed by WV protocol relay into different protocols (SIP+HTTP+probably SOAP) to be able to continue with WV services into IMS systems.

The WV-IMS server or relay would provide interoperability between IMS and WV servers using SSP protocol after the appropriate mapping of SIP+HTTP+probably SOAP into HTTP containing the WV scripts. This case applies when the WV-IMS server or relay is used for communicating with already deployed WV systems where they use SSP to communicate with other systems. In this case the WV-IMS performs the functionality for establishing a security association with WV server and mapping of presence, group management and messaging transactions between both systems. Both IMS and WV systems have been completely deployed as separated domains and the IMS-WV relay provides the interoperability between them.

The WV-IMS server or relay would provide interoperability between IMS and WV terminals using CSP or CLP protocols after the appropriate mapping of SIP+HTTP+probably SOAP into HTTP containing the WV scripts. This case applies when the WV-IMS server or relay is used for communicating directly with existing WV terminals that want to utilise IMS services. This case the IMS-WV performs the functionality for security, mapping of WV login procedure into IMS registration, capability negotiation and other presence and messaging services between WV clients and IMS services. Only IMS system have been deployed but still interoperability for WV terminals can be provided using the IMS-WV relay.

The WV-IMS server or relay would provide interoperability between IMS and WV terminals using SIP protocol and the appropriate mapping to CSP or CLP translating IMS messages with SIP messages into CSP or CLP messages with HTTP and WV scripts. This case applies when the IMS-WV server or relay is used for communicating IMS terminals with WV servers for utilising WV services. This case the IMS-WV performs the security access by mapping the IMS registration into WV log in procedure. Only WV systems have been deployed but still the IMS-WV relay provides interoperability to IMS terminals that want to access to WV services accessing like normal IMS terminals.

These and other objects, features and advantages of the present invention will become more apparent in light of the following detailed description of a best mode embodiment thereof, as illustrated in the accompanying drawing.

BRIEF DESCRIPTION OF THE DRAWINGS

FIG. 5A shows a flowchart which may be carried out by the controller of FIG. 5, according to the present invention.

BEST MODE FOR CARRYING OUT THE INVENTION

Figure 1:
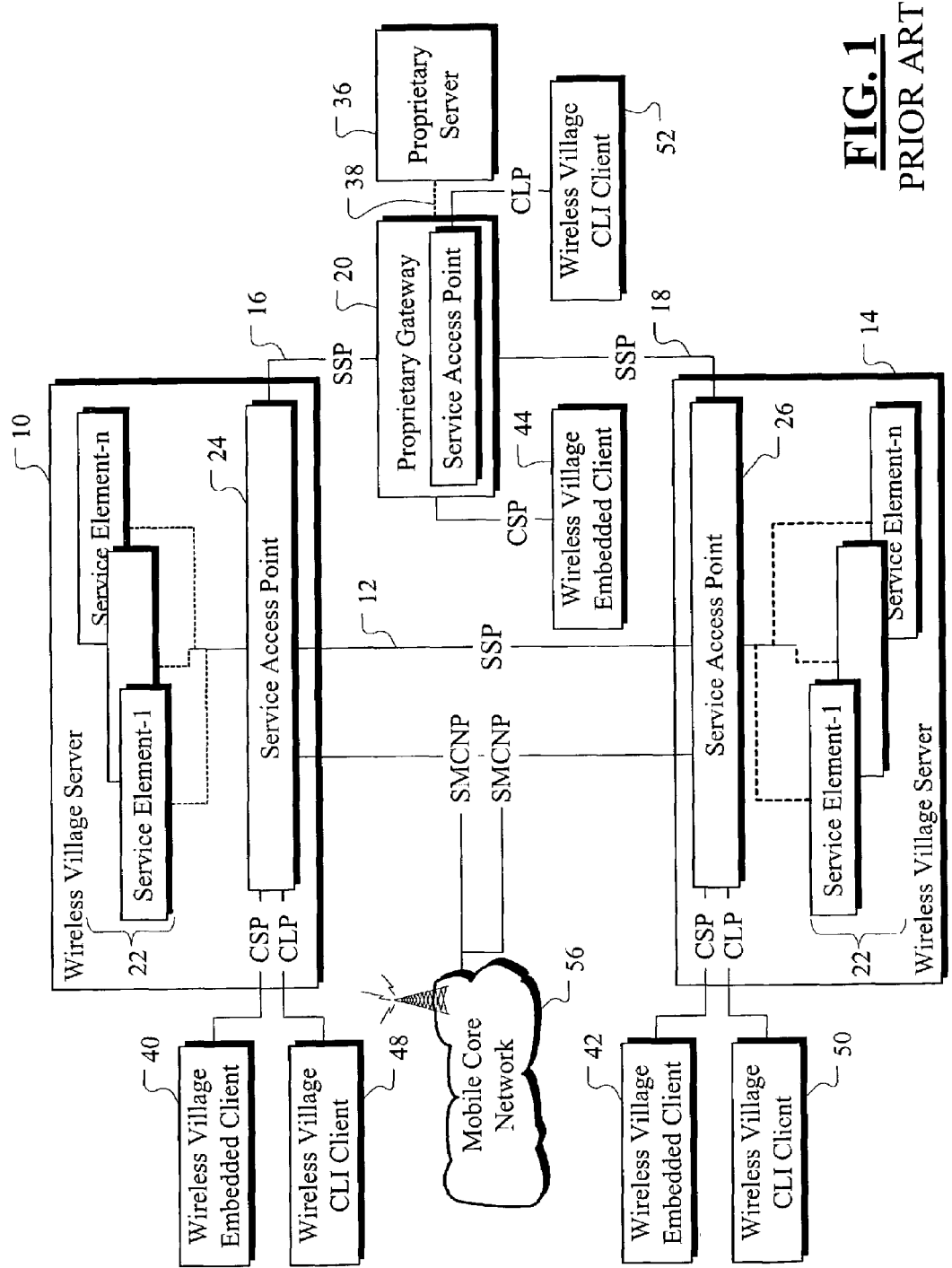
FIG. 1 shows a prior art wireless village system architecture model.
Figure 2:
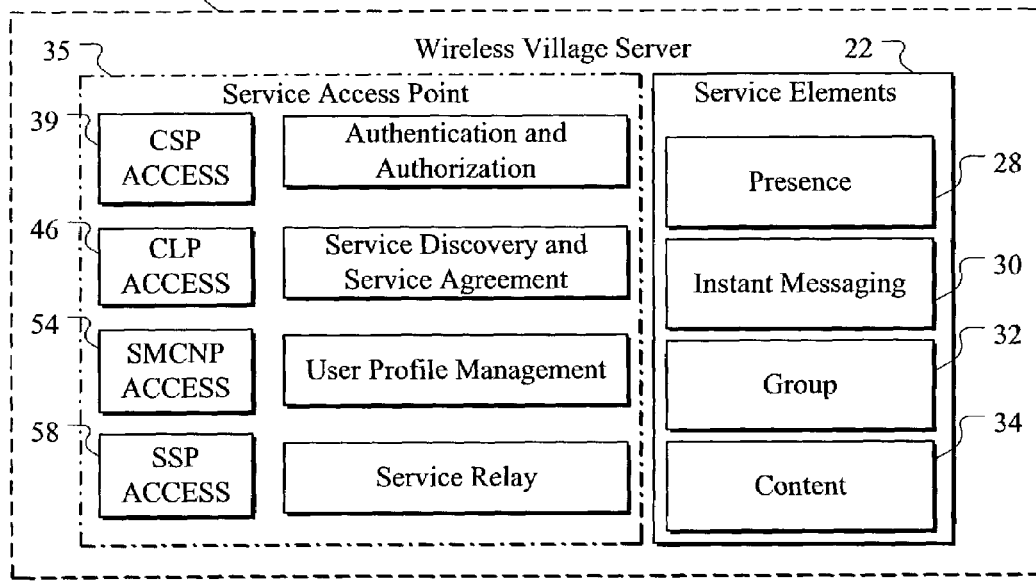
FIG. 2 shows the service access point of the wireless village server of FIG. 1 in more detail.
Figure 3:
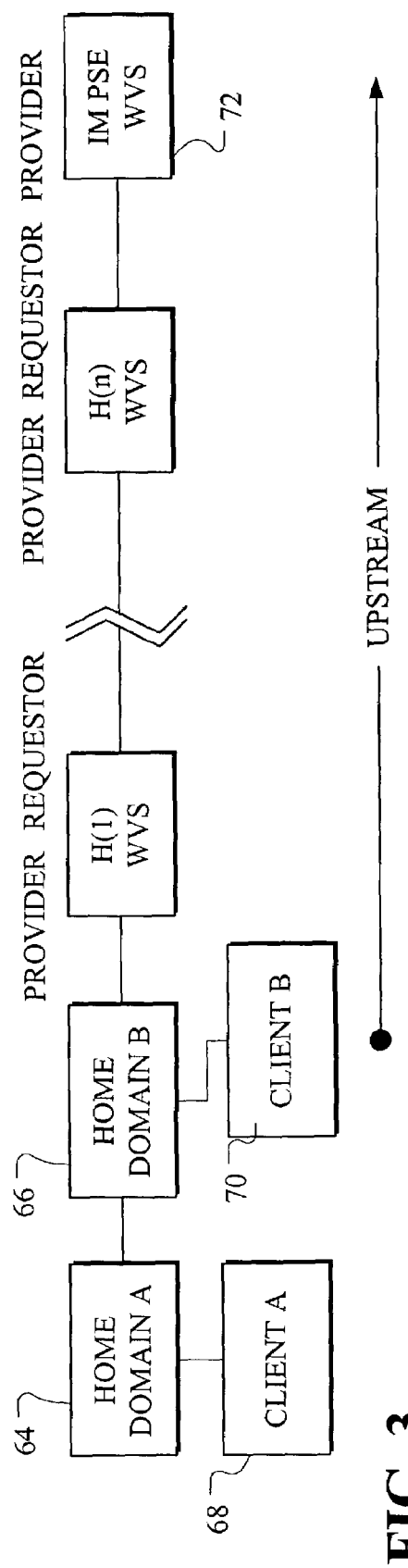
FIG. 3 shows a prior art service relay function of the wireless village consortium.

FIGS. 1-3 have already been described above.

Figure 4:
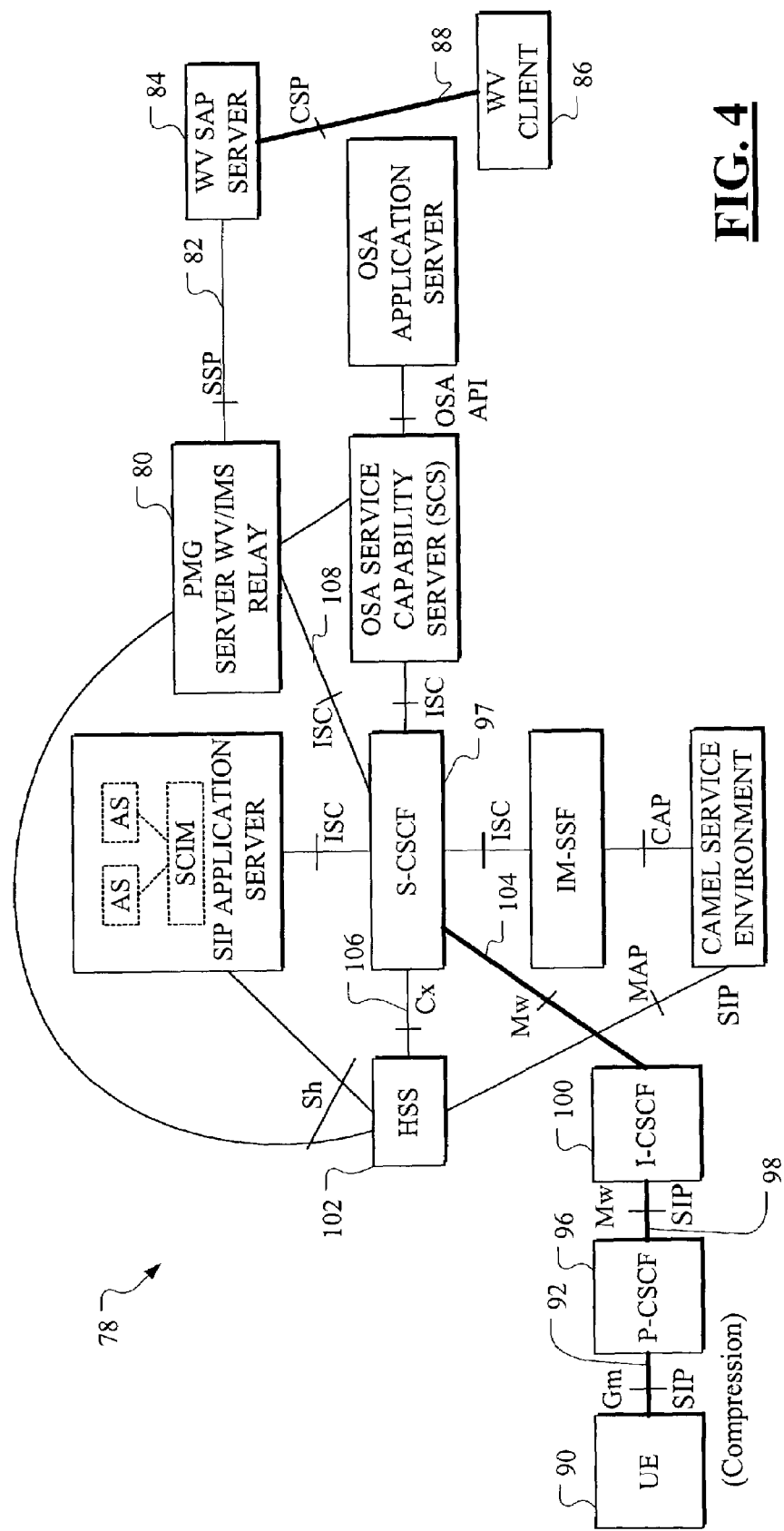
FIG. 4 shows a simplified block diagram of an IMS architecture utilizing the session initiation protocol and having a presence, messaging and group (PMG) server augmented with the added WV-IMS functionality interfaced using a server-to-server protocol (SSP) to a wireless village server which is in turn interfaced to at least one wireless village client using a client-to-server protocol (CSP).

FIG. 4 shows a simplified block diagram of an IMS architecture 78 having a Presence, Messaging and Group (PMG) Server 80 interfaced using the WV SSP over a line 82 with a SAP of a WV server 84 communicating with a WV client 86 using the CSP on a line 88. The functionality of the present invention may be included in the PMG server 80 or the WV SAP server 84, as explained below, or in some equivalent server in between the PMG server 80 and the WV server 84 or even outside those boundaries. For purposes of the non-limiting description of embodiments shown below, the PMG server 80 is comparable to the proprietary server 36 of FIG. 1 while the WV server is comparable to the proprietary gateway 20. Likewise, the signal connection on the line 82 of FIG. 4 is comparable to the interface 38 of FIG. 1.

The IMS architecture of FIG. 4 allows access to an IMS client resident in a user equipment (UE) 90 interfacing on a line 92 with the architecture at a Proxy-CSCF (Call Session Control Function) 96, which is the UE's first point of contact in the visited IMS network 78. This P-CSCF acts as a QoS (Quality of Service) policy enforcement point and provides local control for emergency services. It may also perform the local numbering plans directory assistance under the direction of a Serving-CSCF (S-CSCF) 97. The P-CSCF 96 may for instance forward an SIP registration message from the UE 90 and session establishment messages to the home network of the UE. The UE 90 is shown communicating with the P-CSCF 96 using the SIP on the line 92. The P-CSCF also uses the SIP to communicate on a line 98 with an interrogating-CSCF (I-CSCF) 100 which is the first point of contact within the home network from a visited network. Its job is to query the HSS and find the location of the serving CSCF 97. It should be realized that the P-CSCF 96 could bypass the I-CSCF 100 and contact the S-CSCF 97 directly. The I-CSCF 100 can nevertheless be used to perform load balancing between multiple S-CSCFs with support of an HSS (home subscriber server) 102. The I-CSCF 100 hides the specific configuration of the home network from other network operators by providing the single point of entry into the network. The I-CSCF 100 can also perform some forms of billing. If it is used as a gateway, as shown in FIG. 4, to the home network, it must support a firewall function.

The serving CSCF (S-CSCF) 97 communicates with the I-CSCF 100 on a line 104 using the SIP. It performs the session management for the IMS network and can be one among many S-CSCFs in the home network 78, which may be added as required. It can relinquish session control if such can be performed elsewhere. Note that the home network of the UE provides the service features and therefore the UE is not restricted to the capabilities of the visited network, as in the case of the current GSM network.

The HSS (home subscriber server) 102 acts as a centralized subscriber database, as in the GSM network's HLR (home location register). It interfaces with both the interrogating and serving CSCFs 100, 97, to provide subscriber location and subscription information. It communicates using a protocol called Cx according to the UMTS Specification 3GPP TS 29.228 entitled, "IP Multimedia (IM) Subsystem Cx Interface; Signaling Flows and Message Content". Thus, the HSS 102 of FIG. 4 is shown communicating, for instance, using the Cx protocol on a line 106 between the HSS and the S-CSCF 97. This is the only non-IETF protocol within the IMS architecture 78. The S-CSCF 94 is shown communicating on a line 108 with the PMG server 80, also using the SIP.

Figure 5:
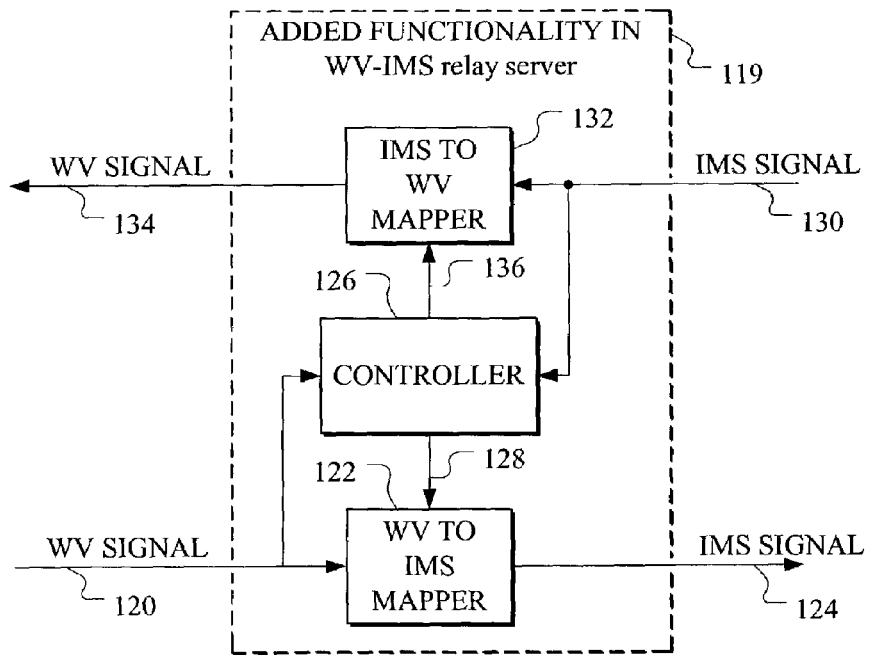
FIG. 5 shows an added functionality which may be added to a server having, for instance, a presence, messaging, chat and content service capability, according to the present invention.

It will be understood that the WV server 84 and client 86 of FIG. 4 are not part of the 3GPP IMS architecture 78. As suggested above, according to the present invention, a device such as the PMG server 80 of FIG. 4 or the WV SAP of WV server 84 of FIG. 4 or some other similar device may be provided with a standalone or an added functionality, such as shown in FIG. 5, with the ability to map IMS messages to Wireless Village messages and with the ability to map WV messages to IMS messages. In other words, it will at least in part give the server in question the ability to operate in another system delivering similar services but according to a different design. For instance, if collocated with a WV server 84, it would give the Wireless Village server the ability to act as an intermediary for the performance of presence, messaging, chat and content delivery between WV and IMS systems. If made resident in an IMS server, it would likewise give the IMS server the ability to act as an intermediary for the performance of presence, messaging, chat and content delivery between WV and IMS systems. The location of the added functionality is not critical.

Turning now to FIG. 5, a server having, for instance, a presence, messaging, chat and content service capability in a given system design, for instance, an IMS system design or a WV system design, may have the added functionality 119 provided, according to the present invention, as shown. This added functionality allows an incoming WV signal on a line 120 having a WV format to be mapped (converted) by means of a WV-to-IMS mapper 122 to an IMS signal 124 having an IMS format, i.e., SIP. This may be done under the control of a control device 126, which is also responsive to the incoming WV signal on the line 120 for providing a control signal on a line 128 to the WV-to-IMS mapper 122.

In addition to being able to map WV messages to IMS messages, the added functionality of the present invention contemplates the reverse direction, i.e., mapping (converting) IMS messages to WV messages. Thus, FIG. 5 shows an incoming IMS signal on a line 130 having an IMS format provided to an IMS-to-WV mapper 132, which in turn provides a WV signal on a line 134 having a WV format. The control 126 is also responsive to the incoming IMS signal on the line 130 for providing a control signal on a line 136 to the IMS-to-WV mapper 132 in order to control the mapping function from the IMS signal on the line 130 to the WV signal on the line 134.

Figure 6:
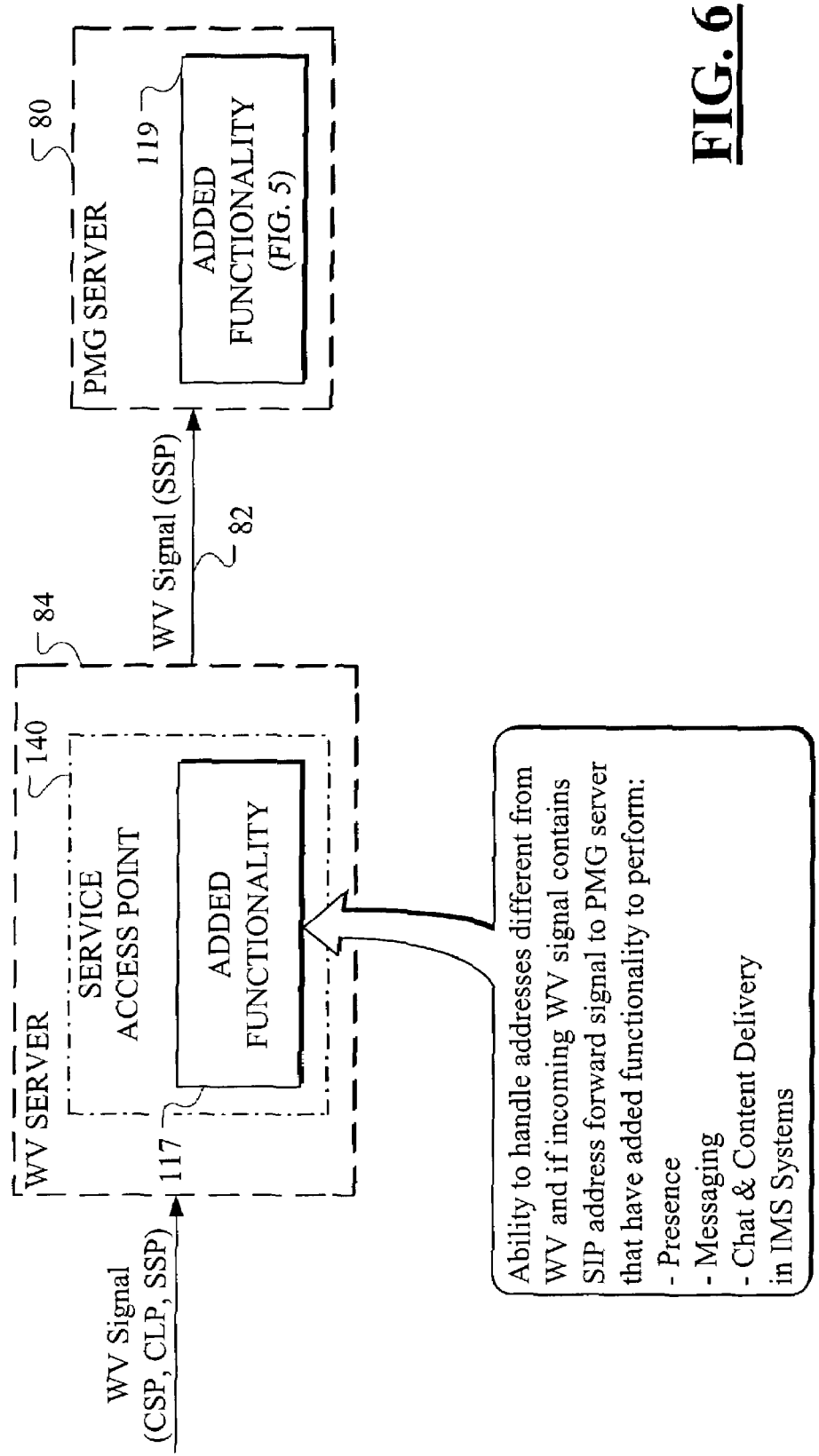
FIG. 6 shows the functionality added to a service access point of a WV server to enable the IMS interoperability between an IMS system and an already deployed WV system through WV servers via a PMG server with the added functionality of FIG. 5 and minimum or no added functionality required in the WV server such as shown.
Figure 7:
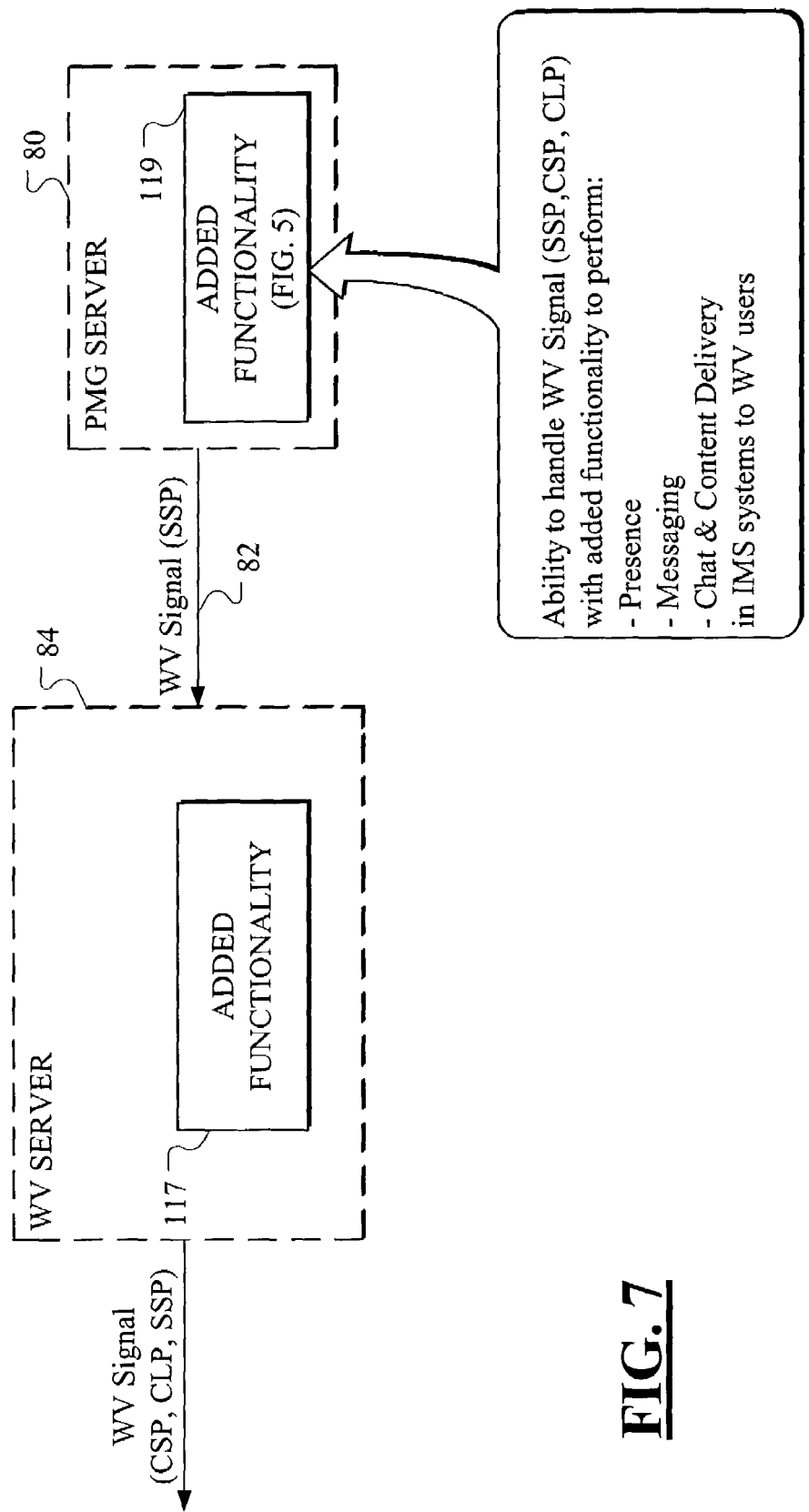
FIG. 7 shows the added functionality of FIG. 5 added to a PMG server for enabling the interoperability between IMS and already deployed WV terminals. Interoperability between IMS systems and already deployed WV terminals permits WV clients access to IMS services via the PMG server with the added functionality of FIG. 5. The WV terminals may communicate directly with PMG servers with CSP or CLP protocol. The added functionality that resides in the PMG server functions as a genuine INS client on behalf of the WV terminal.
Figure 8:
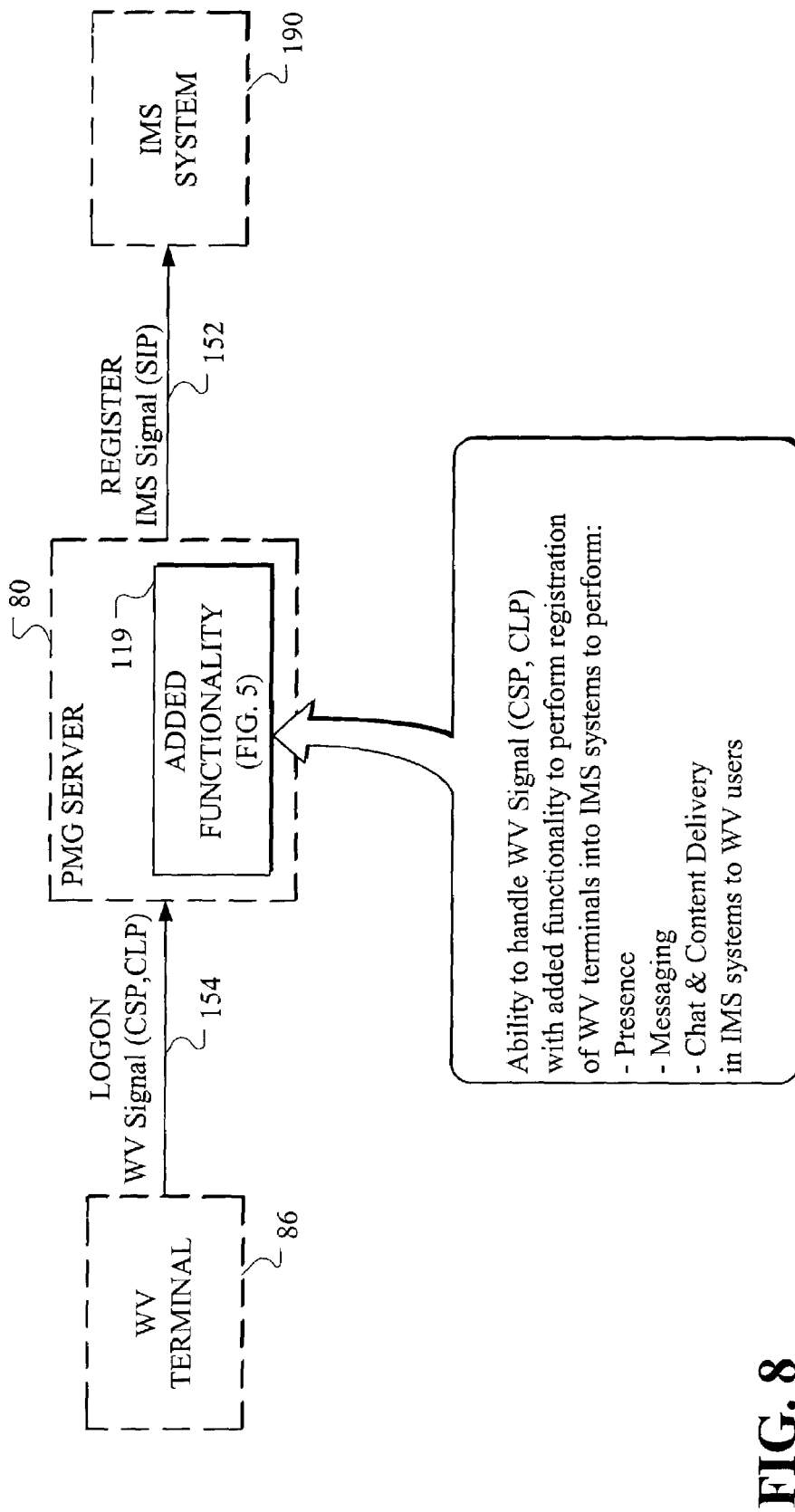
FIG. 8 shows the PMG server of FIG. 4 with added functionality of FIG. 5 acting on behalf of a WV terminal to perform a registration process in the IMS network architecture of FIG. 4 when the WV terminal logs onto the PMG server. Interoperability between IMS systems and already deployed WV systems through WV servers via a PMG server with the added functionality of FIG. 5 has the abilities as shown in FIG. 8. The WV server and PMG server communicate with an SSP protocol. All added functionality resides in the PMG server and a minimum or no functionality is required in the WV servers.

The added functionality 119 shown in FIG. 5 can be added to any server, for instance, it can be in the WV server or a separated or collocated entity with the WV server 84 of FIG. 4, as shown in FIGS. 6, 7 and 8. To minimise the additional enhancements required in WV servers as shown in FIG. 6, the functionality 119 is shown being added to the IMS server (PMG) collocated with the WV server 84. The WV server does not require any modification, except for adding processing logic 117 that recognizes SIP addresses within WV messages and forwards them on the line 82 to the collocated entity with the added functionality 119 using SSP. The added functionality 117 gives the WV server 84 the ability to perform presence, messaging, chat and content delivery in IMS systems via the collocated PMG server 80 with the added functionality 119. FIG. 7 shows the added functionality 119 that is also put in the PMG server 80 of FIG. 4 and performs the added functionality 119 at that location for the opposite direction. The added functionality 119 shown in FIGS. 6 and 7 performs the same function as shown in FIG. 5 located in the PMG Server 80. Regarding the WV Server 84 of FIG. 7, it receives a WV signal in SSP format on the line 82 that has been converted from SIP format by an IMS to WV mapper 132 such as shown in FIG. 5. The WV server 84 of FIG. 7 converts the SSP signal on the line 82 to CSP, CLP or SSP, as appropriate. This will depend on whether the WV server 84 is communicating with a wireless village embedded client 40, 42 in which case CSP is used, a wireless village CLI client 48, 50 in which case CLP is used or another WV server in which case SSP is used. The preferred solution, however, is to minimise any modifications in the WV server or in IMS (PMG) servers by including the added functionality 119 in a standalone IMS/WV server or relay interposed in between the PMG server and the WV server (if both are deployed). Such an IMS/WV Relay is also useful for cases where an operator has only deployed IMS or WV, as shown below. Examples of signaling and message transfer using various approaches will be described below in detail, but it should be realized that the added functionality may be located in other entities as well, and may even be separated in part to perform the same total function in a distributed manner, with part performed in one location and another part in another location. Moreover, there may be other interfaces requiring added logic (such as added logic or functionality 117 of FIGS. 6 and 7) to be located in other adjacent entities in order to enable or enhance the functionality and operation of the present invention. For instance, the added functionality 117 shown in the WV Server 84 of FIG. 7 is used for identifying WV signals incoming from end-user devices with SIP schema so that they may be routed from the WV Server 84 to the PMG server 80.

Figure 6A:
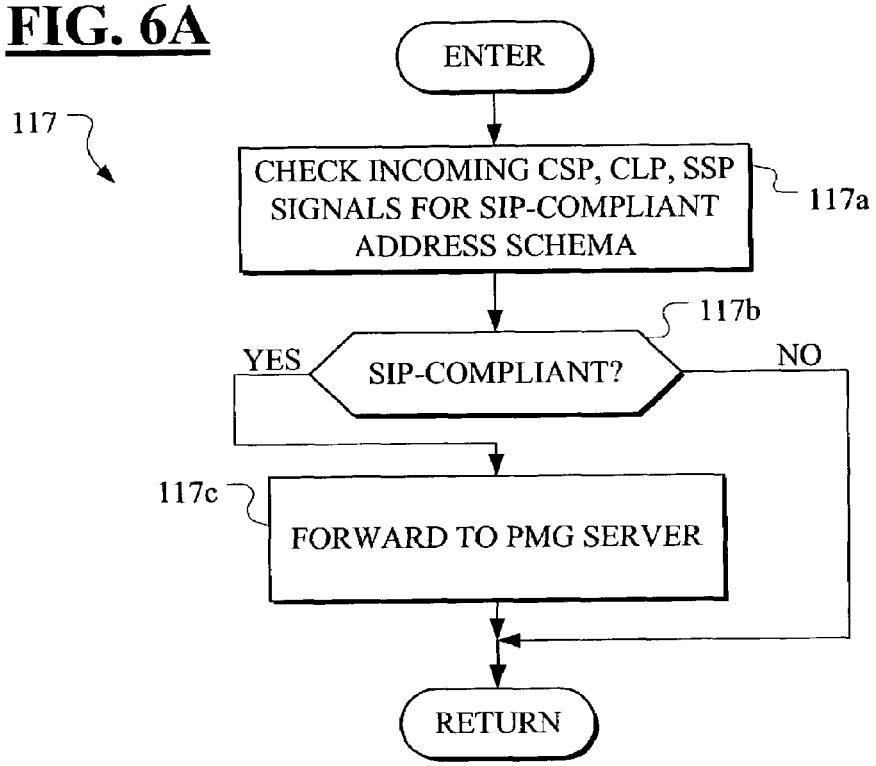
FIG. 6A shows added functionality which may be added in an IMS system for recognizing WV addressing schema in SIP signals, according to the present invention, so as to forward such signals to the WV.

As mentioned, if the interoperability functionality of the present invention (for permitting communication between WV and IMS terminals) is made resident in the PMG server, as in FIG. 6, the logic 117 is required at the WV SAP to forward all transactions with SIP-compliant address schema ("sip", "im", "pres") to the PMG server as shown in FIG. 6A. As can be seen in FIG. 6A, a routine may be carried out after entering a first checking or step 117a incoming CSP, CLP, SSP signals for SIP-compliant address schema. If SIP-compliant address schemas are determined in the step 117b, a step 117c is executed to forward the incoming signal from the WV server 84 to the PMG server 80 of FIG. 6, followed by a return. If no SIP-compliant address schema were determined in step 117b, the return is made directly without forwarding the incoming signal to the PMG server. In other words, the incoming CSP, CLP, or SSP signal would be treated as a purely WV signal. Other entities within the IMS require similar minimum address functionality 117 added to handle WV addresses similarly to SIP addresses (see further discussion below). The PMG server 80 of FIG. 6, upon receiving the message from the WV SAP 140, performs an address lookup and message translation (e.g. content of WV instant messaging into MIME content or similar). Then, the PMG server will forward the WV message to the IMS network entities (X-CSCF) for its normal routing to the IMS client.

It should also be understood that the new functionality 119 may, but need not, include the ability to perform all the Presence, Messaging, Chat and Content Delivery services in either the WV or in the IMS system. It could perform a subset.

The added functionality 119 handles all the WV/IMS features such as security, login procedure, capability negotiation and other protocol transactions. Thus, the added functionality 119 is not simple gateway functionality because, among other abilities, it not only has to be able to map messages but perform authentication procedures according to IMS/WV procedures.

Figure 9:
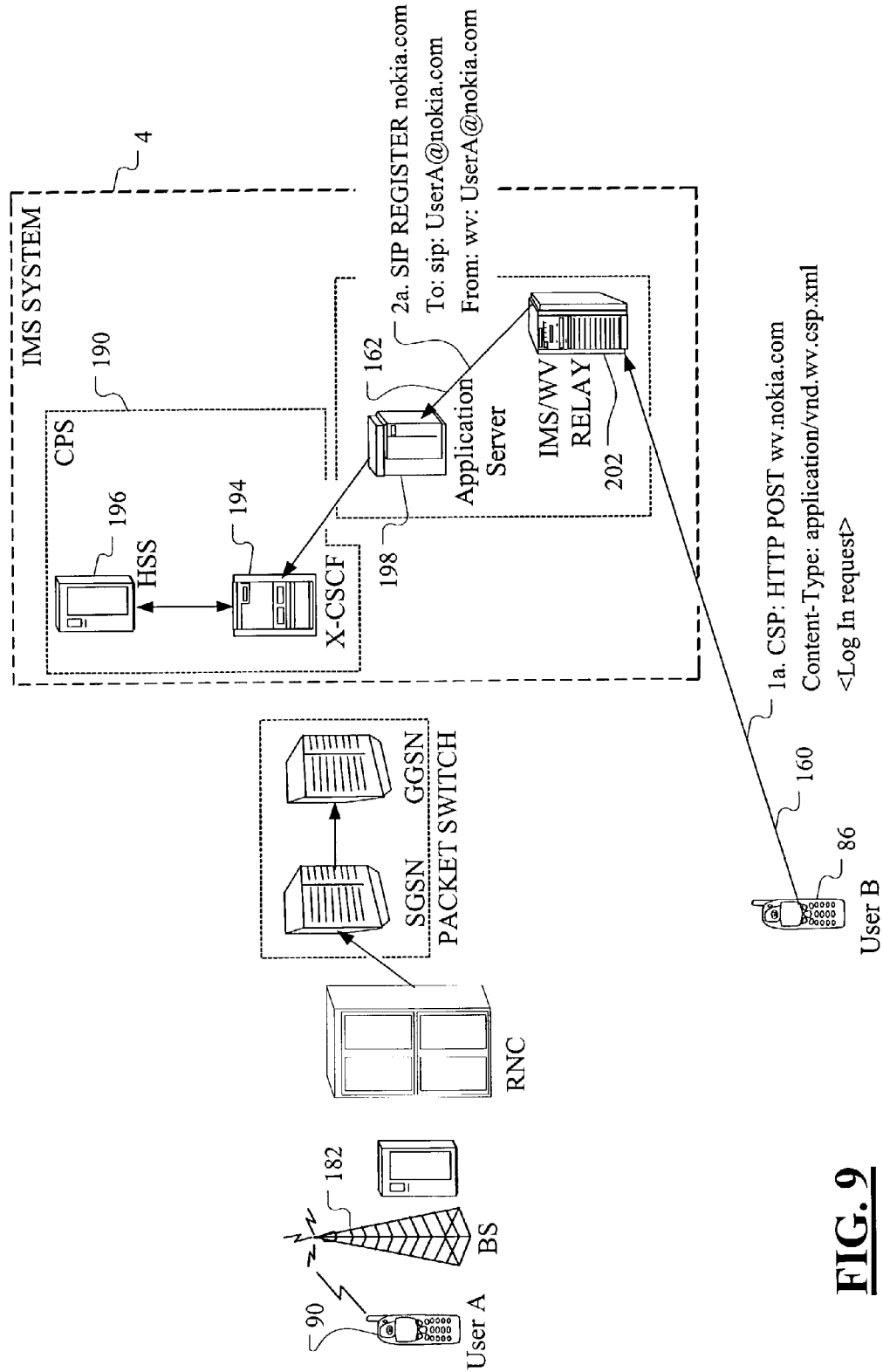
FIG. 9 shows a WV terminal performing a log in procedure into an IMS system according to FIG. 8, for a situation where an operator may have deployed IMS but not WV, and where the WV-IMS relay in turn performs an IMS registration procedure onto the IMS system on behalf the WV terminal.

FIG. 8 shows a WV terminal 86 able to log on to a PMG server directly, for instance in a case where an operator has deployed an IMS system but wishes to allow WV terminals access. As shown in FIG. 8, the WV-IMS or PMG server 80 of FIG. 4 (with functionality 119) acts on behalf a WV terminal 86 and may perform a registration 152 in the IMS network CPS server 190 when the WV terminal logs onto 154 the PMG Server 80. The WV-IMS or PMG server 80 will enable the client of WV terminal 86 to implement messaging, presence and other services in IMS systems while keeping its WV applications. FIG. 9 is similar to FIG. 8 except showing the WV terminal 86 performing a logon 160 procedure to the IMS-WV Relay server 202 which in turn performs a registration procedure 162 onto the IMS system 190 via Application Server 198. The added functionality of FIG. 5 should therefore be understood to include the conversion or mapping processes necessary to carry out the registrations of FIGS. 8 and 9, and mapping of WV transaction into SIP (as well as the reverse situation shown in FIG. 12 to be discussed below where an IMS system has not been deployed but an operator wants to give IMS terminals access to the operator's deployed WV system).

Once the logon or registration is accomplished as presented in FIG. 9, the added functionality 119 of FIG. 5 is able to receive WV/IMS messages or other content (e.g., presence) from WV-IMS terminals and map same by means of the mappers and control device of FIG. 5.

Figure 5B:
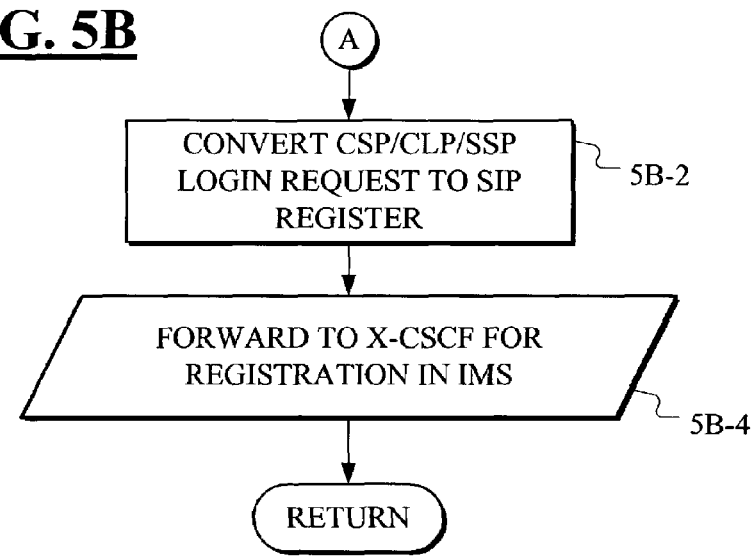
FIG. 5B shows a WV login request converted and forwarded to the IMS for registration of a WV device in the IMS.

FIG. 5A shows a methodology which may be carried out in the added functionality 119 of FIG. 5 within the controller 126 for affecting the log in procedure of FIG. 8 or FIG. 9. As shown in FIG. 5A, after entering in a step 5A-2, a step 5A-4 is executed to determine if a log in request has been received either directly from a WV terminal as shown in FIGS. 8 and 9 using CSP or CLP or indirectly through a WV server using SSP. If so, a transition is made through the procedure shown in FIG. 5B which may be carried out by the WV to IMS mapper 122 of FIG. 5. In FIG. 5B, the mapper 122 converts the CSP/CLP/SSP log in request to an SIP register method as shown for instance in the format shown at reference numeral 2A in FIG. 9 on the line 162.

Before proceeding to a further description of the implementation of messaging and presence using the added functionality of the present invention, it will be useful to discuss addressing in some detail in order to explain the mapping functionality of the present invention.

Addressing

The WV consortium has specified its own addressing schema, which do not differ excessively from SIP based addressing. For details of the SSP addressing schema, see Sec. 4.3 of the "Server-to-Server Protocol Semantics Document, v 1.1" and for CSP, see Sec. 4.2 of the WV specification entitled "Client Server Protocol, v 1.1", both sections entitled "Addressing". The SSP and CSP addressing schema are consistent with each other and are based on the URI of RFC 2396 ("Uniform Resource Identifiers (URI): Generic Syntax"). The addressable entities include user, contact list, group, content, message and service (SSP unique). In addition, "other" address spaces may be used to interoperate with other systems, although the use of other address spaces is up to the implementation and out of the scope of the WV specifications. The "wv:" schema shown below in the URI indicates the WV address space. The generic syntax is defined as follows:

| | |
|---|---|
| WV address = | Service-ID \| Message-ID \| Other-Address |
| Other Address = | "wv:" [User-ID] ["/" Resource] ["@" Domain] |
| Global-User-ID = | User-ID "@" Domain |
| Resource = | Group-ID \| Contact-List-ID \| Content-ID |
| Domain = | sub-domain *("." sub-domain) |

Where User-ID refers to the identification of the Wireless Village user inside the domain. "Domain" is a set of the Wireless Village entities that have the same "Domain" part in their Wireless Village addresses. Domain identifies the point of the Wireless Village server domain to which the IMPS service requests must be delivered if the requests refer to this domain. "Resource" further identifies the public or private resource within the domain. The sub-domain is defined as in RFC 822. The Service-ID is globally unique to identify a server (either a WV server or a Proprietary Gateway).

When the Global-User-ID is present without the Resource, the address refers to the user. In SSP, the user is always identified in the global scope.

When the Global-User-ID is present with Resource, the address refers to the private resource of the user. When the User-ID is not present, the Domain and the Resource must always be present, and then the address refers to a public resource within the domain.

The domain must always be present in SSP addressing to globally identify the user or resources, and used for address resolution of those network entities.

The following shows the main points of comparison with SIP:

-SIP addressing:

| | |
|---|---|
| SIP-URL = | "sip:" [ userinfo "@" ] hostport url-parameters [ headers ] |
| userinfo = | [ user \| telephone-subscriber [ ":" password ]] |
| hostport = | host [ ":" port ] |
| host = | hostname \| IPv4address \| IPv6reference |
| hostname = | *(domainlabel ".") toplabel [ ":" ] |

The WV "UserID/Resource" is equivalent to the "userinfo" in SIP URL, and the "Domain" part from WV address is comparable to "hostport" in a SIP URL. The addresses are similar but the transport protocols are different. The transport (WSP, http, https versus SIP, http) and message format for the signalling parts are completely different so interoperability functionality 119 requires a change in the semantics of the messages.

Therefore, for providing interoperability functionality 119 in terms of addressing for routing purposes, according to the present invention, a transport independent addressing schema is used such as "im:" and "pres:" Those schemas are related to the service itself rather than the transport. By using these schemas, the address included in the URL (independently whether they are "wv" or "sip" specific) can be placed into those schema for being routed towards the right domain based on the "hostport" or "domain" information within the URL.

Such requires that the WV clients communicate their resource address to other clients using those SIP compliant schemas ("sip", "im" or "pres") and the receiving server should have the feature or recognize and support those schemas. Thus, the IMS terminal will always receive address schema that can be routed or translated into addressable schema according to the SIP specifications. The alternative is that the IMS terminal should interpret the "wv:" schema and convert it into an SIP-compliant URL ("sip:"). According to this invention, a URL-parameter is included for indicating that the original URL contained a WV schema (;user=wv) to enable the correct mapping at the end point.

Figure 5C:
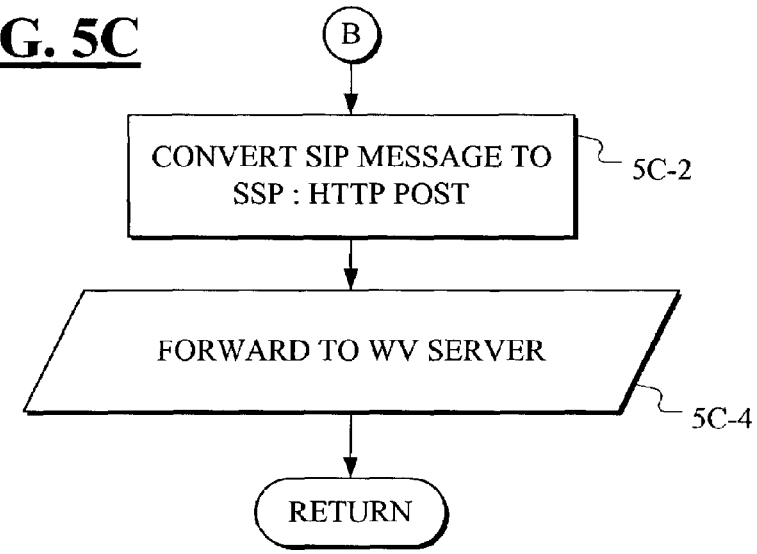
FIG. 5C shows an IMS SIP message converted to SSP and forwarded to a WV server.
Figure 6B:
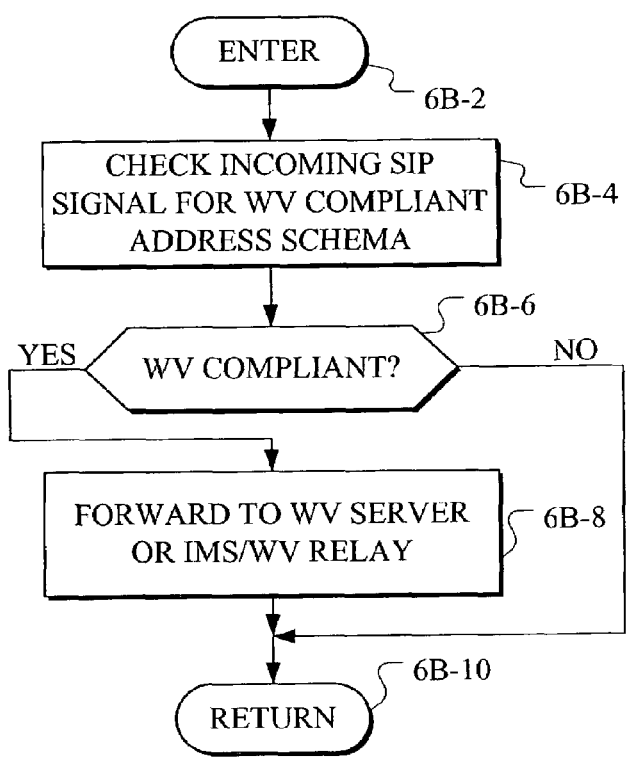
FIG. 6B shows added functionality which may be added in a WV system for recognizing IMS addressing schema in WV signals, according to the present invention, so as to forward such signals to the IMS.
Figure 10:
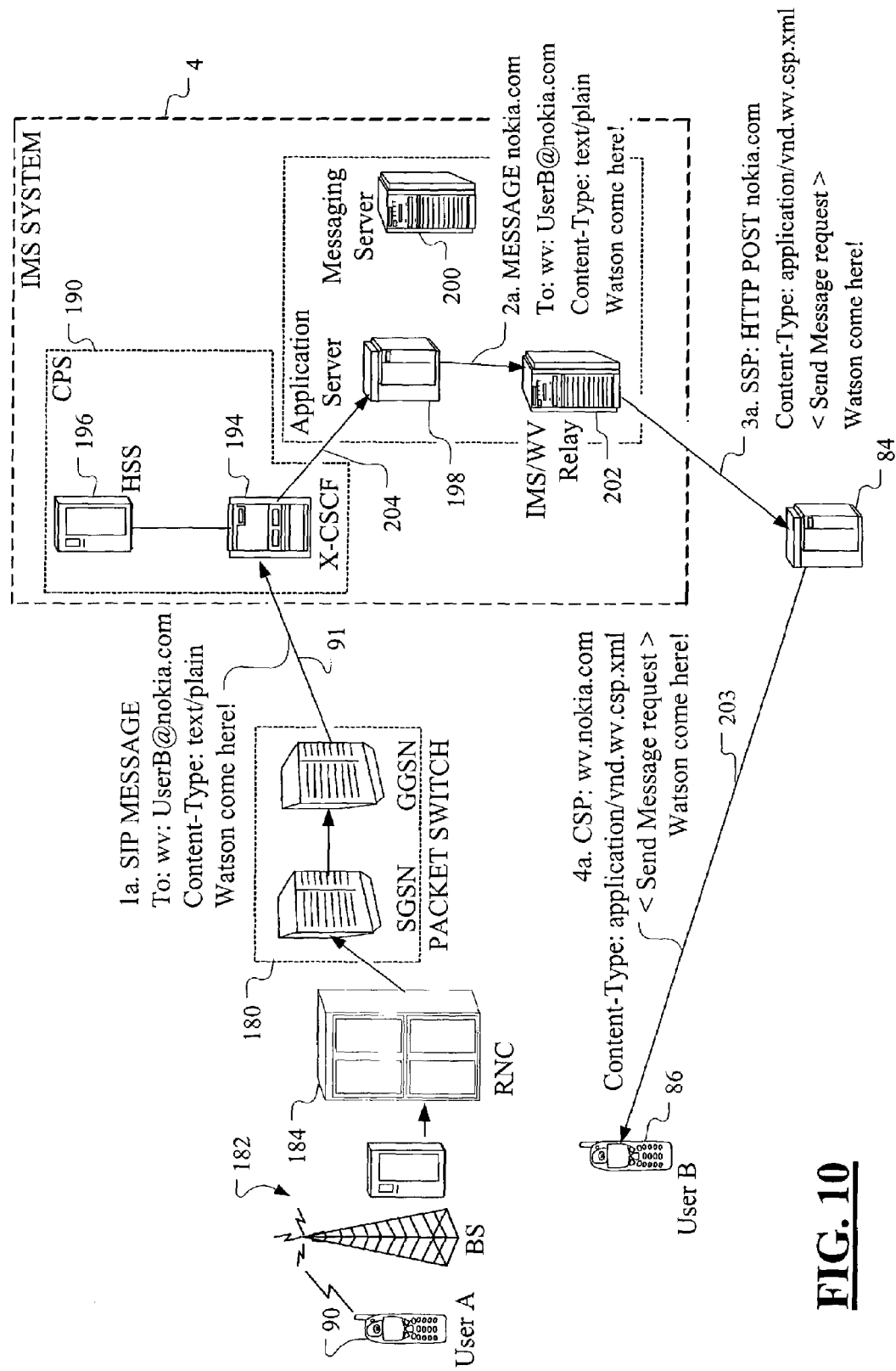
FIG. 10 shows an IMS terminal communicating with a wireless village terminal via various network elements and including the WV-IMS server or relay, which may be carried out according to the present invention. The WV-IMS server or relay with the added functionality of FIG. 5 receives an SIP message, converts it to SSP for the WV server which in turn converts it to CSP for delivery to the WV terminal.

FIG. 10 shows an IMS terminal 90 communicating with a Wireless Village terminal 86 via various network elements included in for instance the GPRS packet switch addition 180 to GSM or via a 3G system. Both include a base station (BS) 182 (called "Node B" in 3G) in radio communication with the terminal 90 and a radio network controller (RNC) 184. The radio network controller 184 is in turn connected to the packet switch 180 which may include a GPRS SGSN and a GGSN. In a system with the added functionality 119 of the present invention, the IMS terminal 90 might send a message in the SIP format as shown on a line 91 at 1a with SIP addressing Schema "sip:" as usual but with the WV schema. This SIP message is processed by a Call Processing Server (CPS) 190 which includes one or more different kinds of CSCFs (X-CSCF) 194 as well an HSS 196, as explained above in connection with the IMS environment of FIG. 4. Furthermore, the message is sent to an application server 198 and/or to a messaging server 200 in case the operator has installed a specific messaging server for handling all transactions related to the messaging service. The operator can have a single Application Server that handle all Presence, Messaging, Group Management services (PMG server) or the operator can have separated servers to handle each service (Presence, Messaging, etc). In the latter case the messages are forwarded from the Application Server to each of the different service specific servers depending on the type of transaction (MESSAGE->Messaging Server 200, SUBSCRIBE/NOTIFY->Presence Server (not shown in FIG. 10), etc). In any case, according to the present WV specifications, in order for the message to be able to be sent to the Wireless Village terminal 86, the message should then be sent (due to the WV schema) either from the Application Server (as shown) or from the separated server 200, to the IMS/WV relay or server 202, which should change the transport protocol and the format of the content in the body of the message. This is shown at 2a sent from the Application Server (or the Messaging server) to the IMS-WV relay using the original SIP message. The IMS_WV Relay 202 will convert the transport protocol and message format according to the WV SSP using an http POST to the WV server 84 as shown at 3a, which in turn provides a CSP message on a line 203 as shown at 4a. However, in reality, it is not that simple, as discussed above. For instance, the IMS/WV relay 202 previous to any messages exchanged with the WV server 84, it has to set a security association between the IMS-WV relay and the WV server for the SSP transactions. The IMS/WV relay has to keep a session ID and transaction state for the duration of the communication between the WV server and the Application Server (or PMG server; Presence, Messaging, Group server). The IMS/WV relay 202 should implement different functionality depending whether the communication is established with a remote WV server that "speaks" SSP protocol, or the IMS/WV relay is communicating directly with WV terminals in the local domain that want to access IMS services, as in FIG. 9, using CSP. Thus, the IMS/WV server has to be equipped to operate according to the SIP protocol as well as the WV SSP and CSP protocols. If the communication between the IMS/WV Relay 202 and the WV server 84 is to be using the SSP protocol, then an IMS client residing in the terminal 90 of FIG. 10 will communicate with the WV server 84 using an SSP protocol as shown at 3a in FIG. 10. There is also a need for the additional functionality 119 having to maintain an SSP channel with the WV server 84 for exchanging messaging, presence and group related primitives. If the communication is done between the WV terminal and the IMS system, as shown in FIG. 9, the IMS/WV relay should be able to handle CSP protocol transactions for allowing the WV terminal to log into IMS systems as a genuine IMS user (see FIG. 8) and to subsequently receive messages, etc., using CSP. Thus, the IMS/WV relay 202 with the augmented functionality 119 may communicate with the application server 198 either with the WV server 84 (FIG. 10) or directly WV clients 86 (FIGS. 8 & 9), according to one embodiment. The IMS/WV relay includes solutions to the just mentioned problems and therefore having the added functionality of the present invention, i.e., enabling WV clients to perform presence, messaging, chat and content delivery in IMS systems. Note that the SIP message on a line 91 sent from terminal 90 (see reference numeral 1*a*) is translated as shown at reference numeral 3*a* where the transport protocol is changed to HTTP and the information contained in the SIP headers To: and From: are encapsulated into the XML scripts used in WV specification. Note also that the MIME-encapsulated message content is different also in that it no longer identifies "application/txt" but rather "application/vnd.wv.CSP.xml". The initial content in the body of the SIP message (text) is placed into the XML structure according to WV specs and after changing the transport to HTTP, the content is replaced by the MIME type defined for WV messages. The application server receives this SIP signal on a line 204 from the CPS 190 and after checking that destination address is a WV terminal (noting that To: header or Request-URI contain a "wv" schema or a url-parameter indicating it is a WV address), it forwards the message to the IMS-WV relay that makes a protocol conversion from SIP to SSP. Thus, the application server 198 or the message server 200, as the case may be, will have to have functionality shown in FIG. 6B which makes it able to check SIP messages for WV-compliant address schema. FIG. 6B shows after entering in a step 6B-2 checking incoming SIP signals for WV compliant address schema in a step 6B-4. If a WV compliant address schema is found as determined in a step 6B-6, the incoming SIP signal is forwarded to the IMS/WV Relay or WV Server as indicated in a step 6B-8. If the incoming SIP signal is determined in the step 6B-4 and the step 6B-6 to not be WV compliant, it is treated as a pure IMS signal and stays within the IMS system. In any case, a return is made in a step 6B-10 as shown in FIG. 6B. Once it is determined that a WV client is the intended destination then the application server 198 or the messaging server 200 determines that a forwarding operation (6B-8) on the line 205 for instance is required to the IMS/WV relay 202. This is shown in FIG. 10 for instance on the line 205 from the application server 198 to the IMS-WV relay server 202, according to the present invention. The IMS/WV relay 202 then makes a conversion from the SIP message format shown at reference numeral 2*a* to the SSP format shown at reference numeral 3*a* and forwards the SSP message from the IMS/WV relay 202 to the WV server 804 using HTTP as the transport mechanism. The WV server can receive the SSP message and recognize the format in the body of the HTTP request since it is in the WV specific format. The WV specifications allow having different address schemas from "wv" but it should be stated that if the functionality presented in this invention (FIG. 5), is implemented in a separated server than the WV server, the WV server should allow including SIP addresses in the CSP and SSP transactions. The WV server then provides the message on a line 203 in the CSP format as shown at 4*a*. Regardless of where the added functionality 119 of the present invention is located in this case, e.g., the IMS/WV Relay 202, a step 5A-6 will be carried out as shown in FIG. 5A to determine whether an SIP message such as the SIP message received on the line 205 by the IMS/WV Relay has been received from the IMS system with WV schema. This is carried out by the controller 126 of FIG. 5 residing for instance in a SAP of the IMS/WV Relay 202. A transition from FIG. 5A to FIG. 5C is then made in order to allow the IMS to WV mapper 132 of FIG. 5 to carry out a mapping from an IMS signal in the SIP format to a WV signal in the SSP format as shown in FIG. 10. Referring back to FIG. 5C, a step 5C-2 is executed by the mapper 132 to convert the SIP message on the line 205 to SSP as shown by the reference numeral 3A in FIG. 10 and as forwarded according to the step 5C-4 by the IMS/WV Relay 202 to the WV Server 84. A return is then made according to FIG. 5C.

Required Interoperability Functionality

The WV client 86 is required to log in to the WV server 84 to be able to use the WV services. In the login phase, the user is authenticated and a session is established. When the client doesn't want to use the WV services anymore, the client may log out of the service. During all the session transactions the WV messages should include the same Session ID and the same applies for the transaction ID that is kept during the transaction period. The log on procedure is performed between the WV terminal and the WV server. When providing WV clients access to IMS systems this mechanism is kept and the interoperability is defined, e.g., at the IMS-WV relay between the IMS elements (Application or PMG server) and the WV server that communicate with SSP. This level of interoperability enables to operators to deploy both WV and IMS systems separately where each terminal logs on its own system (IMS or WV servers) and still provide interoperability between them using SSP via the proposed IMS-WV relay.

As discussed above, another level of interoperability with IMS applies when the IMS-WV relay also provides the mapping of CSP into SIP. This interoperability applies for the providers that implement only IMS systems but still want to give access to WV terminal that only speak CSP. This approach does not require having a WV server where the WV clients can log on, but the IMS-WV relay provides the CSP functionality and logs on the WV terminals as genuine IMS terminals as in FIGS. 8 and 9.

In both cases for interoperability with IMS, the CSP and SSP transactions cannot be directly mapped to a SIP based exchange. The SIP messages can be session or session-less, so only the transaction ID can be directly extracted from the SIP messages and considered as the WV transaction ID. The same cannot be applied for the session ID since the WV sessions tends to have a longer lifetime than a SIP session.

Therefore, according to the present invention, it is proposed that the IMS-WV relay 202 with the added functionality 119 of the present invention, receives the login message from the WV terminal (FIG. 9) and will infer a session ID at the time when the WV client accesses the the IMS-WV relay server 202. The session ID will last as long the IMS-WV relay server 202 considers appropriate, and it can trigger a Keep Alive message or in IMS terms, refreshment of the authentication is needed until the WV client logs out from the IMS-WV relay server. The added functionality 119 will infer the required transaction ID and perform the appropriate IMS authentication/authorization on behalf of the WV client mapping the WV mechanism into the UMTS AKA. This can advantageously be carried out at the IMS-WV relay server that can be part of the PMG server that provides Presence, Messaging and Group Management services.

The WV specifications have separated the signalling part from the service specific content into different structures. Accordingly, it is easier to use a different transport mechanism for the service data. The service specific data (presence information, message content, etc.) could be re-used to some extent by applying certain mapping in an appropriate Relay prior to delivery to the terminal (e.g., wv presence structure->SIMPLE tuples).

The following describes the impact on each service in terms of required functionality to provide interoperability between PMG and WV systems.

WV Interoperability

The routing of messages within IMS follows a basic procedure, which comprises sending the SIP message to the Proxy-CSCF and from there to the Serving-CSCF assigned to the terminal during its registration. If the recipient is not located in the same domain, the S-CSCF has to obtain the address of the next hop (I-CSCF) for the recipient's domain. The lookup is based on the information contained in the Request-URI of the SIP message and it uses DNS for obtaining the address of the I-CSCF in the recipient's domain using the domain part of the Request-URI ("sip: username@yahoo.com"->the domain part="yahoo.com") to query the DNS server. In case the Request-URI contains a "tel:" scheme, then it is required a new DNS service named tElephone Numbering Mapping (ENUM). ENUM is similar to the DNS service but when it is queried returns the domain part of the phone number, i.e. the S-CSCF queries ENUM server using tel: +358405201815 and it will return the domain part that is the operator that owns that number; "sonera.com". Thus the S-CSCF converts "tel:+35842021815" into "sip: +3584052018@sonera.com" and from there, it continues a normal DNS query for obtaining the I-CSCF of sonera operator using the domain part of the address "sonera.com"). In SIP, a Request-URI is defined in RFC 2543 as a type of URI used to indicate the name of the destination for the SIP Request (INVITE, REGISTER, MESSAGE, SUBSCRIBE, NOTIFY, etc.). The SIP Request is forwarded by proxies, the Request-URI can be changed as database lookups and feature invocations change the final destination of the request.

Figure 11:
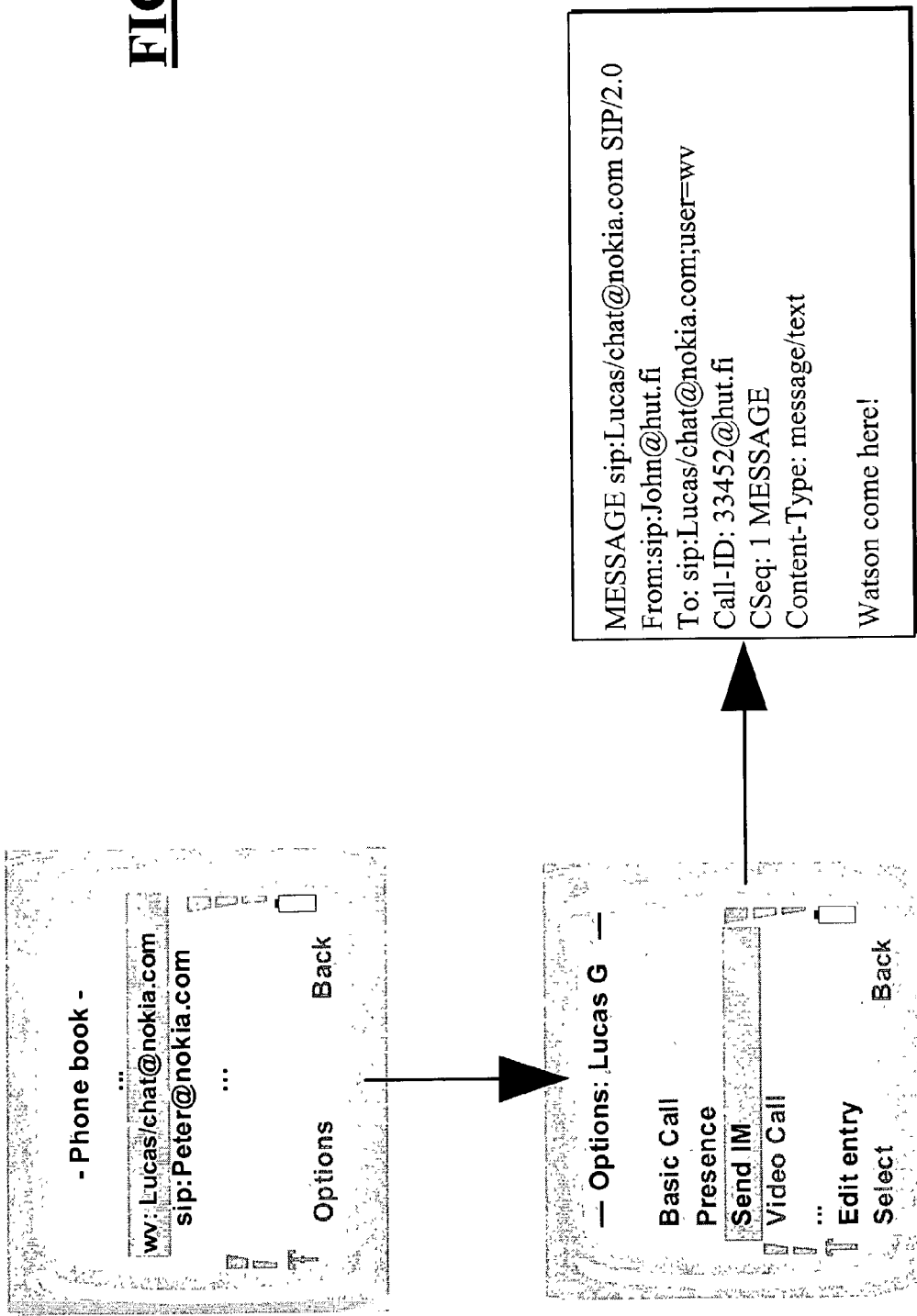
FIG. 11 shows using WV addresses at a terminal such as the IMS terminal 90 of FIG. 10.

SIP messages should use "sip" or "sips" in the Request-URI and "sip", "sips", "im", "pres" in the "To" header for instance as shown in FIG. 11 to avoid the possibility that any intermediate network entity might reject the message because of unsupported schema (sending an error message 416, indicating that the address format is incorrect).

As suggested above, to provide interoperability with WV terminals, the "wv:" can be proposed as an extension to existing schemas allowed in the "To" header. Nevertheless, the preferred solution is to use the actual schemas that are independent of the transport and define a url-parameter to include information indicating that originally it was "wv:" address. The goal is to maintain the actual network behavior using SIP compliant schemas and include url-parameter that has significance just in the last hop. This will permit the usage of WV addresses in a seamless manner, since the content of a WV address can be placed in a SIP URI and the new url-parameter is only used at the end point. The management of this header is similar to the conversion of "tel" into "sip" URL. See S. Lind (AT&T), "ENUM Usage Scenarios," Internet Draft (draft-ietf-enum-usage-scenarios-00.txt), June 2002. The user can type a "tel" URL that contains the MSIDN number but after ENUM query it is translated into a SIP URL and the "user=phone" header stores the information indicating it was originally a phone number (The address that user types is the following "tel: +123232321" and after performing a ENUM request the address is converted into the following "sip:+123232321@nokia.com;user=phone". Therefore, if the initial "wv" scheme is not supported, the same approach is proposed to be used when instead of typing a phone number, the user types the address of another WV terminal. The initial address that user types or selects (see FIG. 11) is the following "wv:john@nokia.com" and after similar conversion to ENUM either in the terminal or in the network the address is converted into the following "sip:john@nokia.com; user=wv).

Finally, for complete transparency in the routing across the IMS domain towards the PMG server, it is required to have the WV users registered as IMS terminals or to have the logic in the x-CSCF 194 recognise WV addresses within SIP messages. Once the PMG with IMS-WV functionality server receives messages containing addresses for WV users they can be translated into an SSP message for the WV server. The logic for recognising WV users within an IMS system can be accomplished in two different ways depending on the provider policy for providing interoperability with WV systems.

1) In case the IMS-WV relay can act as SIP User Agent Client it could perform a third party registration in the IMS domain after the WV terminal logs into the IMS-WV relay server. The WV clients will be considered as IMS clients and they will use their specific applications and addressing schema. The WV terminals have to log into the IMS-WV relay servers and will negotiate the required services for the new session. Therefore the interoperability functionality required MIGHT trigger a IMS registration (third party registration) 152 (FIG. 8) upon receiving a WV log in message 154 from a WV terminal 86 that wants to get a messaging service. As proposed for general interoperability requirements, the WV terminal will be registered with the same address but using a SIP compliant address schema (i.e. "sip" or "im" Instant Message URI or "pres" for Presence Service). The WV URIs will be translated into a "sip" address without losing information since WV Client ID and SP address are quite similar.

| REGISTER sip: | sonera.com |
|---|---|
| To: sip: | Peter@sonera.com |
| From: sip: | Peter@sonera.com |
| Contact: wv: | Peter@wv.sonera.com; methods = "MESSAGE", pres Peter@wv.sonera.com; methods = "SUBSCRIBE" |

During the registration process the "Contact" header MAY include other URI schemas different from SIP or SIPS. Thus, it is proposed that the IMS-WV relay registers the WV terminals using their own "wv" schema or "im" schema for messaging or "pres" for presence.

2) The second alternative is to have a complete WV system that will interoperate with an IMS system, where all WV terminals are logged in their own WV servers and communicate with IMS system via IMS-WV relay from their WV servers. This requires to recognise WV addresses in IMS and uploading the information into the HSS, with a pre-assigned S-CSCF for attending to all WV terminals. This S-CSCF upon recognizing the messages addressed to a WV terminal will forward it to the PMG server with the added functionality 119 for the mapping into WV SSP protocol. This is straightforward where the pre-assigning S-CSCF uses a Filter Criteria (a logic that is used for routing the messages depending on type of request, address, value of To: and From: headers, etc) that could contain the directive indicating that any transaction with "im:", "pres" (or "wv" if proposed and adopted in 3GPP) schema in To: or From: headers or url-parameter containing "wv", are routed to the PMG server with the appropriate WV interoperability functionality.

In the reverse situation there are different cases where the IMS-WV relay provides the required interoperability between WV and IMS systems.

When the operators have deployed simultaneously WV and IMS systems the migration of the services can be done in a seamless manner. In this case the IMS client does not need to be registered in WV servers. It is only required that there be logic in the WV server (FIG. 6A) to recognise that the message contains a SIP address as destination. The WV server based on this logic will forward the message to the IMS-WV relay (in case this entity is not collocated with the WV server) that will be able to make the appropriate conversion into a SIP message (FIG. 10).

Figure 12:
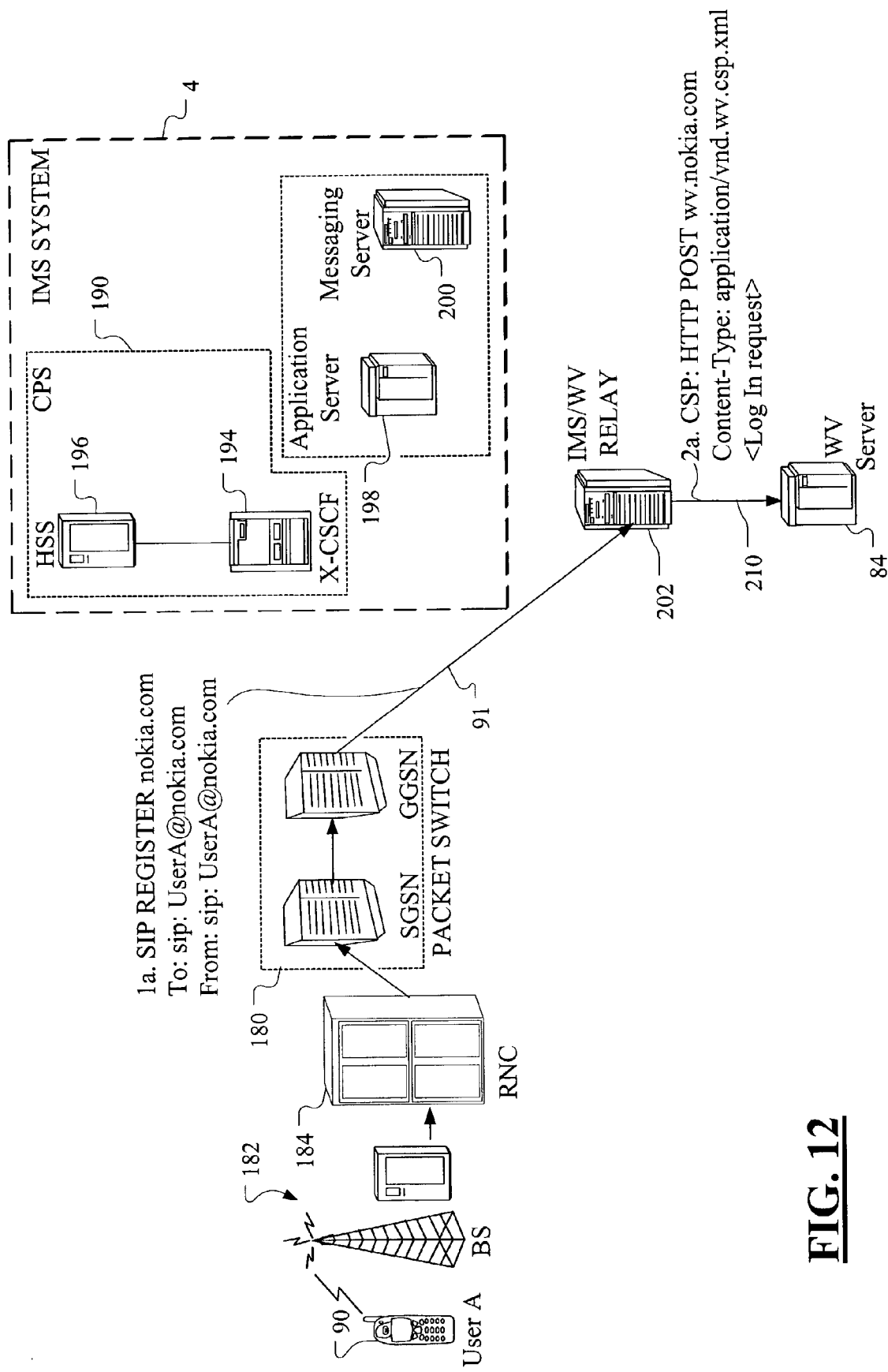
FIG. 12 shows an IMS/WV relay having the added functionality of FIG. 5 processing an SIP register message and converting it to a CSP log in to a WV server, as if it were a WV terminal, according to the present invention. This interoperability scenario applies for operators that have deployed WV systems but not IMS and still want to provide WV services to IMS terminals from their own or different domains.

FIG. 12 shows the case for providing interoperability with IMS systems for operators that have deployed WV systems but not IMS systems. FIG. 12 shows the situation with the IMS client 90 being used by user A to transmit an SIP register message on a line 91 as signified in FIG. 12 by the reference numeral 1a, referring to the signal line directly between the packet switch 180 and the IMS-WV relay 202. The IMS-WV Relay 202 will behave as a X-CSCF 194 in a IMS system 4, considering that the operator does not have an IMS system deployed and the IMS-WV relay 202 act as an SIP proxy-registrar equivalent to an X-CSCF, according to the present invention, which converts the SIP register message 1a received e.g. on the line 91 from the packet switch 180 to a login request signal on a line 210 formatted according to the CSP as shown at 2a in FIG. 12. In other words, the IMS/WV relay 199 takes on the apparent behavior of a WV terminal for this login request so that the WV server receives a message on the line 210 in the client-server protocol (CSP) of the wireless village and it appears to the WV server 84 that User A in the IMS system is really a WV user. Thus, according to the present invention, the IMS-WV relay is not merely a simple gateway entity since it has to implement not only CSP, but also SSP protocols at the same interface (see further description below) for providing interoperability for providers with only IMS or WV systems simultaneously or only one of them. With CSP, the SIP REGISTER is mapped to a registration according to WV "login" procedures by doing the appropriate conversion of the security authorization/authentication mechanism from UMTS AKA in IMS into a WV digest. Once this is accomplished, the IMS client is visible from any WV client. The rest of the transactions are exchanged between the WV server 84 and the IMS-WV relay 202 using the SSP protocol according to the WV specifications. In that case, the WV-IMS relay 202 is then seen from the WV server 84 as another WV server, which uses SSP protocol.

Figure 5D:
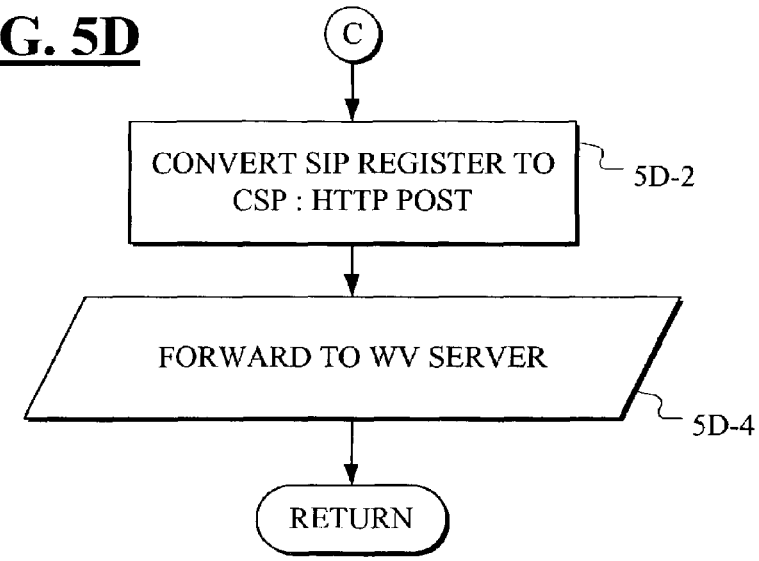
FIG. 5D shows an SIP register converted to CSP and forwarded to a WV server as if it were from a WV terminal logging into the WV system.

Referring to FIG. 5A, a step 5A-8 is performed in the controller 126 of FIG. 5 resident in the IMS/WV Relay 202 of FIG. 12. The controller 126 determines in the step 5A-8 whether an SIP "register" method has been received from a packet switch of a U10TS or GPRS system. If so, a transition is made by signaling on the line 136 to the IMS to WV mapper 132 to execute the procedure of FIG. 5D. The mapper 132 will therefore convert the SIP register method to the CSP protocol as shown at reference numeral 2A of FIG. 12 and forward the CSP signal on the line 210 from the IMS/WV Relay 202 to the WV Server 84.

Messaging

An instant message may be sent to, or received from, a specific WV-user, or users of other instant messaging systems. It is also possible to send instant messages to a group of WV-users. For instance, User A can send an IM to User B and vice versa, User A can send a store-and-forward (S&F) type of message to User B and vice versa and the S&F delivery notification should be conveyed from one technology domain to another.

As mentioned above, the WV clients will use their specific addressing schema within their own domain. As also mentioned, the WV terminals have to log into the WV servers and negotiate the required services for the new session. Therefore the interoperability functionality required at the IMS-WV interface MAY trigger an IMS registration (third party registration) upon receiving a WV log in process 154 (FIG. 8) from a WV terminal 86 that wants to get messaging services. As proposed for general interoperability requirements in systems with IMS but not WV systems deployed, the WV terminal will be registered with the same address. This WV URI will be translated into a "sip" address without losing information since the WV Client ID and SIP address are quite similar, as shown above.

REGISTER sip: sonera.com

To: sip: Peter@sonera.com

From: sip: Peter@sonera.com

Contact: wv: Peter@wv.sonera.com; methods="MESSAGE"

This functionality of the present invention enables any WV terminal to receive messages from the PMG domain. The reverse can also be achieved since the message is sent from WV terminal to the local WV server in the WV domain or to a relay or server as in FIG. 8 or 9. The message can include the "im" or "sip" schema indicating to the WV server that it has to forward the message to the appropriate IMS-WV Relay that will translate the messages to the IMS domain. In this case the WV server requires the logic functionality that recognizes the "im" or "sip" address and forwards the message to the IMS-WV relay, similar to the procedure shown in FIG. 6A.

Figure 13:
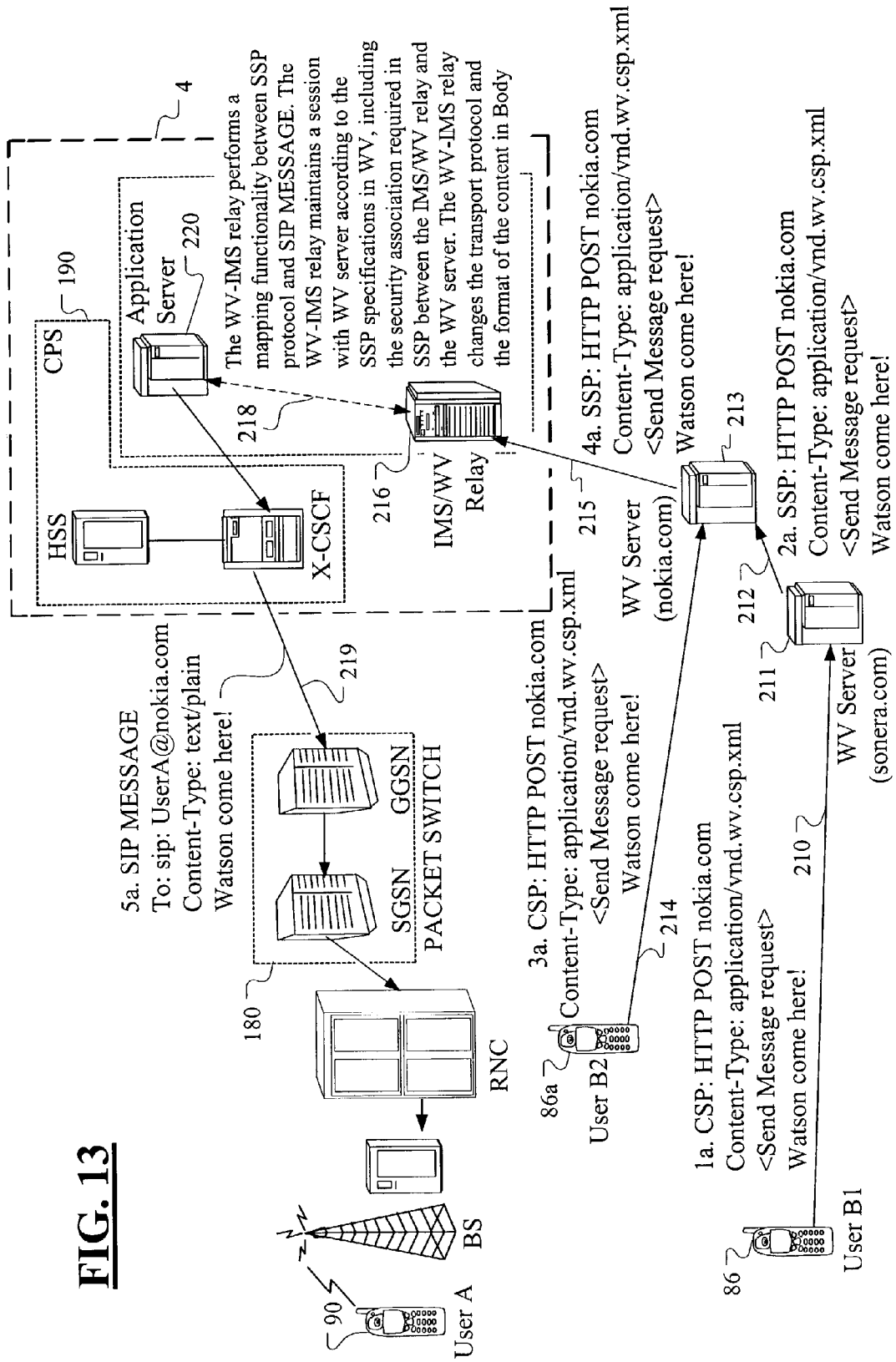
FIG. 13 shows an instant message being sent from one of two alternative WV terminals through a WV server and an IMS/WV relay having the added functionality of FIG. 5 to a user terminal in the IMS architecture.

FIG. 13 shows user B1 using the WV terminal 86 to send a message request on a line 210 to a WV server 211 that has content as shown by reference numeral 1a and using the CSP. The WV server 211 converts the CSP message to an SSP message 2a and forwards it on a line 212 to a WV server 213. Alternatively, another User B2 using another WV terminal 86a could send the same message on a line 214 to the second WV server 213 with the same content as shown at reference numeral 3a. In either event, the WV server 213 sends a message request 4a on a line 215 using the SSP to an IMS/WV relay 216, according to the present invention, within the IMS system 4. The WV-IMS relay 216 performs a mapping functionality 119 (FIG. 5) between the SSP protocol and the SIP MESSAGE method and sends the message on a line 218 to an application server 220 in SIP format. The WV-IMS relay 216 maintains a session with the WV server 213 according the SSP specifications in WV, including the security association required in SSP between the IMS/WV relay and the WV server. As mentioned, the WV-IMS relay changes the transport protocol to SIP and the format of the content in the body of the message, as shown by a message at reference numeral 5a adjacent a signal line 219 between the X-CSCF 194 and the packet switch 180 of the GPRS or UMTS system.

Figure 5E:
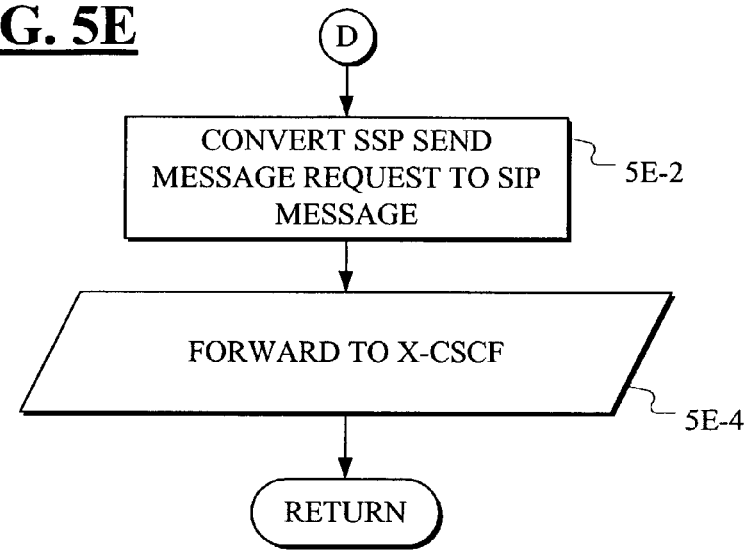
FIG. 5E shows an WV SSP send message request converted to an SIP message and forwarded to an x-CSCF of the IMS.

The added functionality 119 carried out by the IMS/WV relay 216 of FIG. 13 is shown in more detail in FIG. 5A at a step 5A-10, where an incoming WV signal on a line 120 (see FIG. 5), i.e., the signal on the line 215 of FIG. 13, is determined in the step 5A-10 to be a "send message request" in the SSP format having SIP address schema therein. This is carried out by the controller 126 of the added functionality 119 of FIG. 5. Once this is determined, a transition is made to FIG. 5E, where a conversion is carried out by the WV to IMS mapper 122 to convert the SSP message on the line 215 having the format shown at reference numeral 4A to an SIP message having the format shown at reference numeral 5A for transmission through the UMTS or GPRS system to user A at IMS terminal 90. The converted SSP to SIP message is forwarded to the X-CSCF of FIG. 13, according to step 5E-4 prior to being sent to the UMTS or GPRS system. The application server 220 may also be in the route from the IMS/WV relay to the IMS terminal 90.

Figure 14:
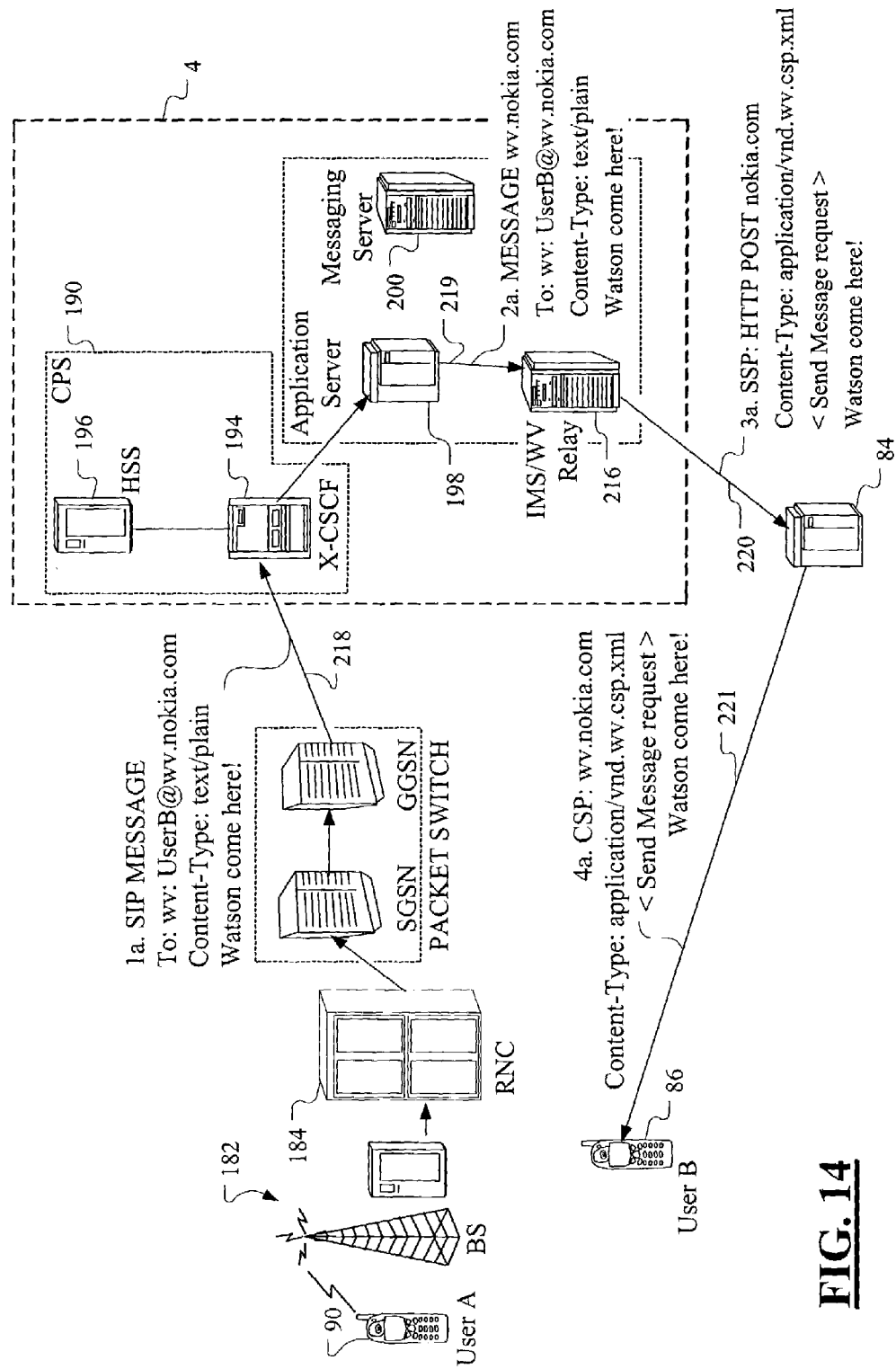
FIG. 14 shows a message sent from a user terminal in the IMS architecture having a proposed "wv:" schema, according to the present invention or defining new URL parameter for storing the "wv:" schema.

Similarly, in the reverse direction as shown in FIG. 14, the IMS user A sends an SIP message on a line 218 as shown propagating between the packet switch 180 and the X-CSCF 194 as indicated by a reference numeral 1a. Note the "wv:" schema in the "To" header (if the systems allows it, or in a url parameter; user=wv (FIG. 11) if the system returns an error when using the intial "wv" scheme) indicating to the X-CSCF 194 that the message should be sent onward (see FIG. 6B) towards the IMS/WV relay 216 which may be via the application server 198 as shown by a signal on the line 219 and with a format as indicated by a reference numeral 2a. The IMS/WV relay 216 then provides a conversion according to FIG. 5 from SIP to the SSP (see also FIG. 5A, step 5A-6 and FIG. 5C, steps 5C-2 and 5C-4) and provides the converted signal on a line 220 to the WV server 84 with a message format as shown at reference numeral 3a. The WV server 84 then converts the SSP message on the line 220 to a signal on a line 221 having a CSP format as shown at reference numeral 4a. Thus, as shown in FIG. 14, on the IMS side it may be proposed that the address contain an identifier ("user=wv" in a url-parameter or the To: header contain the original WV address) that will enable the X-CSCF 194 (according to FIG. 6B, for instance) to recognize that the message has to be forwarded to the IMS/WV relay 216. After that, the WV-IMS relay receives the SIP message on the line 219 and translates the content into the WV format and the transport protocol into the SSP.

Presence

Presence information can be subscribed from WV and IMS terminals regardless of whether the operator has deployed both IMS and WV or only one of the WV and IMS systems, according to the present invention. The content of the presence information should be managed and understood similarly as described above for messaging. A specified mapping of the presence information is required since WV uses its own data structure while IMS terminals following SIMPLE uses a "tuple"-based format (RFC 2778) for presence data. Nevertheless, if new enhancements could be proposed and added in future releases of the WV specifications so that the WV presence data structure supports a "tuple" formatting, it would provide more complete interoperability functionality for presence, but this depends on developments in future releases of WV specifications touching on WV presence data structures.

According to present WV specifications, the WV presence information can be fetched from different internal and external sources through the Service Access Point (SAP):

User A can subscribe to or fetch User B's presence information, and vice versa. Similarly to the IM service the WV client should, according to the present invention, populate their presence information using the "wv" or "pres:" Presence URI. This "wv" or "pres" URI will be translated into a "sip" address without losing information since WV Client ID and SIP address are quite similar. After the terminal maps the "wv" or "pres" into the "sip", the Presence URI can be placed in the Request-URI and "To:" MAY keep the original "pres:" or "wv" address if IMS systems allows it in next releases. Thus, any WV user can send the "wv" or "pres" URI to any IMS client that after mapping to a SIP URI the IMS client can use same for subscribing to the WV presence information. The interoperability functionality added by the present invention therefore requires recognizing the "pres" or "wv" schema and identifying the resource included in the address as WV ClientID. Furthermore, the added functionality should have the added functionality 119 for translating the SIP SUBSCRIBE messages (FIG. 15) and sending back the NOTIFY messages (FIG. 16) and vice versa.

User A can match User B's subscription attempt with his access list (ACL), and vice versa. It is possible to deny the request for presence information. The WV access list should recognize different schemas like "wv" and other externals such as "sip" and "pres". The same applies when WV terminal or the WV server on behalf the WV user tries to subscribe presence of IMS terminal. The IMS access list (ACL) should either include all the possible schemas or the ACL should be built using the resource address of the user or use a common schema such as "pres".

It should be possible to translate a WV presence document to an IMS presence document, which is formatted using "tuple" structures according to RFC 2778. This new feature can be proposed and developed for a future release of the WV presence data specifications. This requires that WV presence data format can be structured into presence data using "tuples".

If WV has filtering for presence document contents or notifications, it should be possible to translate these to their IMS counterparts. Therefore, the additional functionality should be required to manage the received "Content-Type" headers in case SIMPLE filtering is applied for limiting the presence data sent back to the user. The IMS terminals can include filters in the subscription to the presence information for indicating what kind of information they want to receive. Those filters coming from the IMS side would need to be translated into similar WV filters that are also used for limiting the presence information that user wants to receive.

Figure 15:
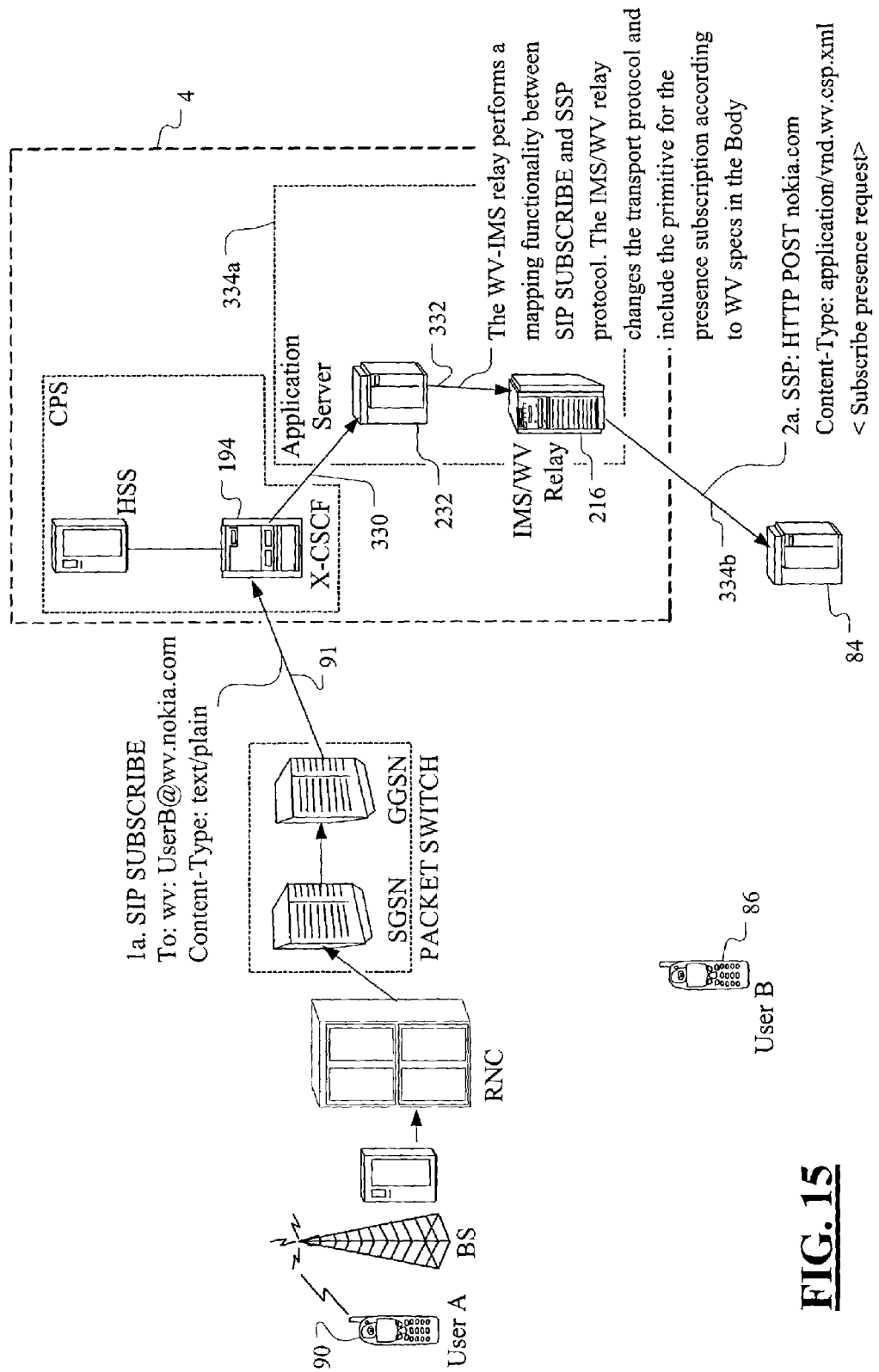
FIG. 15 shows an IMS terminal subscribing to WV terminal presence information, according to the present invention.

In FIG. 15, the IMS terminal 90 subscribes (using SIP as shown at 1a) to presence information of the WV terminal 86. The WV addresses are handled in the x-CSCF 194 as normal addressing (see FIG. 6B) and forwarded to the IMS-WV relay server 216 that will continue the subscription to the WV server 84. In other words, the X-CSCF 194 has added functionality similar to the added functionality 117 of FIG. 7 except being resident in the X-CSCF instead of the WV server for carrying out functionality similar to that shown in FIG. 6B for checking incoming SIP methods for WV compliant addressing schema. If WV schema are identified, the X-CSCF "knows" to forward the SIP subscribe method to the IMS/WV relay 216. If not, the SIP subscribe will stay within the IMS system, as usual. Thus, the IMS client 90 is shown in FIG. 15 subscribing to the presence information of the WV client 86 that is handled as normal IMS subscriber at the X-CSCF. This is communicated from the IMS client (UE) 90 on a signal line 91 to the X-CSCF 194 by means of an SIP SUBSCRIBE method containing the URL of the WV client 86 in the To: (To: wv:user@domain) header or the url-parameter with the "wv" after the "sip:" schema (To: sip:user@domain; user=wv). The X-CSCF 194 then applies any filtering criteria it may have for routing purposes. The filtering criteria may for instance be used in the X-CSCF for indicating the address of the next hop during the routing of the messages (if the message contains a wv address or parameter, then the filtering criteria indicates that the message has to be forwarded to the IMS-WV relay to perform the mapping). The SUBSCRIBE signal may be forwarded on a line 330 from the S-CSCF 94 to the Application Server 232 and from there on a line 332 to the IMS-WV server 216 included as added functionality of a PMG server 334.

Figure 5F:
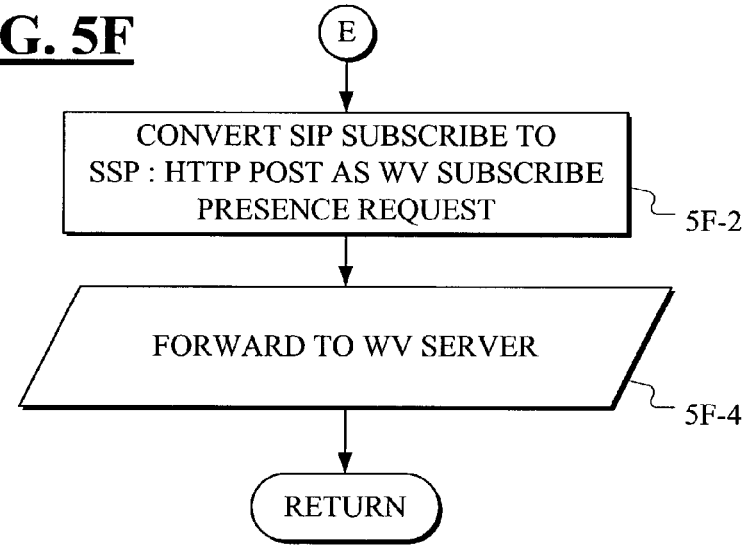
FIG. 5F shows an SIP subscribe converted to SSP and forwarded to a WV server.
Figure 5G:
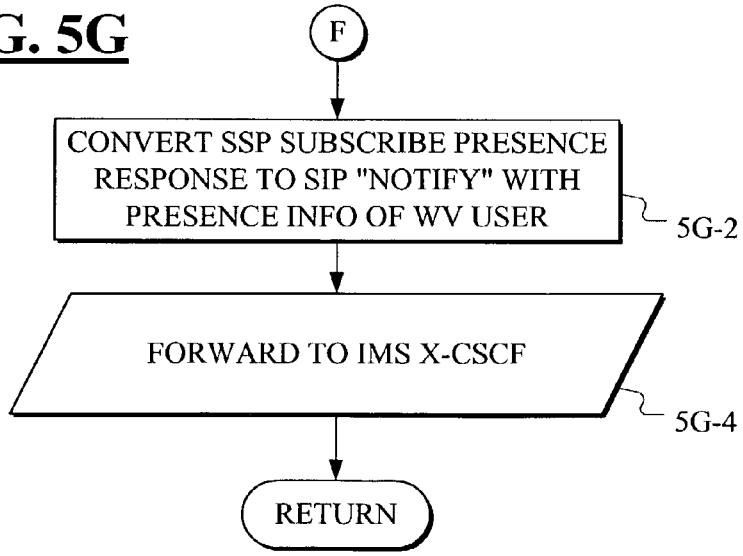
FIG. 5G shows an SSP subscribe presence response converted to an SIP notify with presence information of a WV user and forwarded to an IMS x-CSCF.
Figure 16:
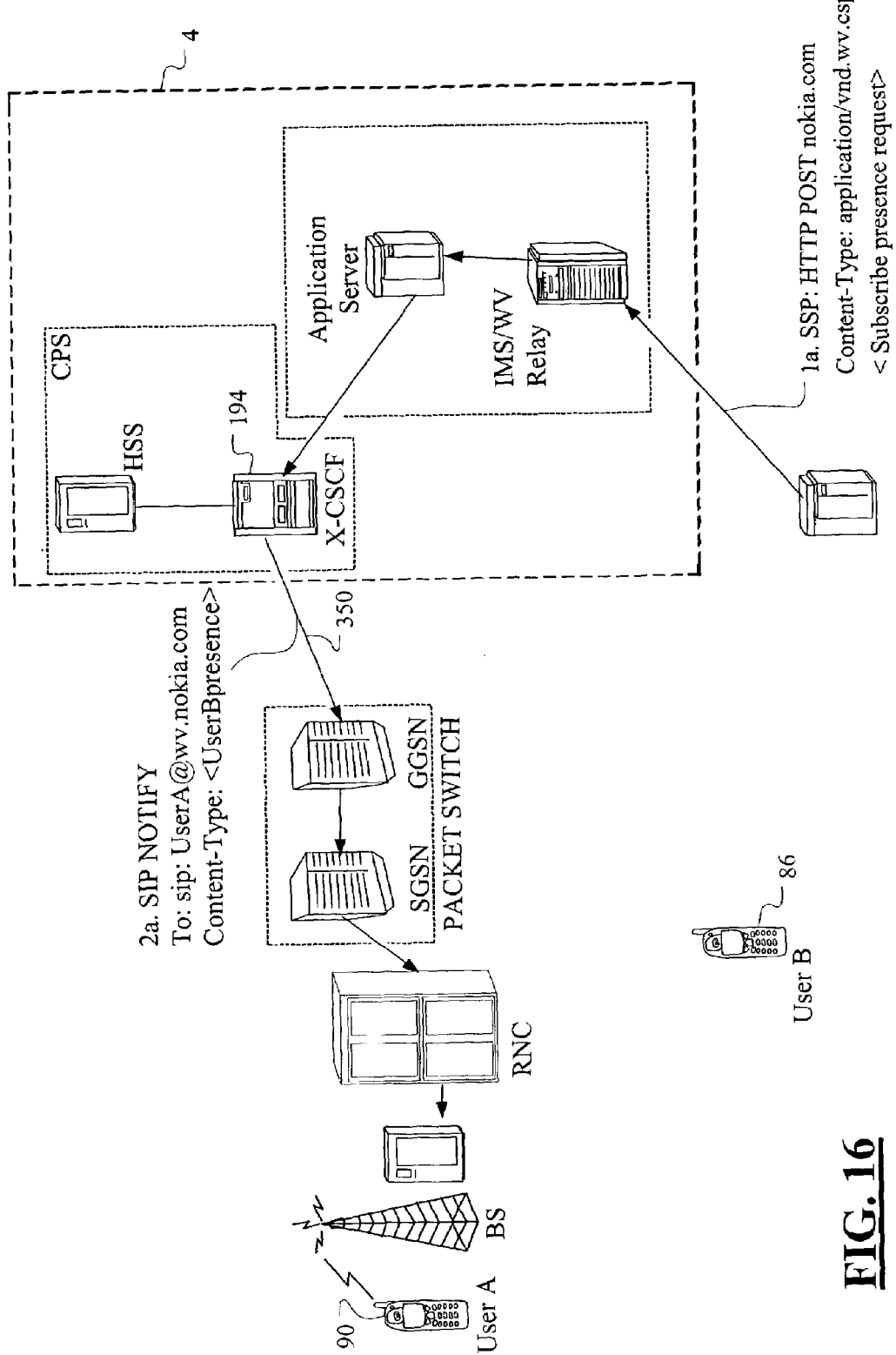
FIG. 16 also shows an IMS terminal after subscribing to WV terminal presence information, using the "wv:" schema (as in FIG. 15) or a newly defined URL parameter for storing the "wv:" schema, receiving the presence information of the WV terminal from the WV server through the WV-IMS relay that performs the mapping between SSP and SIP (convert to NOTIFY) and the formatting of the WV presence data into an IMS presence format.

Because of the functionality 119 (FIG. 5) added, for instance, to the IMS/WV relay by the present invention, the IMS/WV relay 216 of FIG. 15 is able to subscribe the UE 90 to the presence information of the user of WV client 86. The PMG with added IMS-WV relay functionality performs a mapping of the message from SIP to SSP as per the mapping of FIG. 5. Referring to FIG. 5A, the controller 126 of FIG. 5 will execute a step 5A-12 to determine if an SIP "SUB-SCRIBE" method has been received at the added functionality 119 on the line 332 of FIG. 15. If so, a transition is made to FIG. 5F, where the IMS to WV mapper 132 of FIG. 5 carries out steps 5F-2 and 5F-4. I.e, the mapper 132 converts the SIP SUBSCRIBE method to the SSP format shown at reference numeral 2A in FIG. 15 and forwards same on the line 334b to the WV server 84, as indicated in the step 5F-4. The transport protocol is changed from SIP to SSP and includes the primitive for the presence subscription according to the WV specifications in the body. This is best shown in FIG. 15 where the reference numeral 2a shows the change in transport protocol to SSP transmitted from the IMS/WV relay 216 on the line 334b to the WV server 84. The WV server 84 then stores this subscription information locally and sends back a 200 OK signal to the relay 216. The WV Server 84 will then check to see if there is any presence information of the user of the WV client 86 available for authorized subscribers, or if it has changed. A presence access list (ACL) will be consulted to determine if any such presence information is available, to filter same, to see if any existing presence tuples have already been sent to the UE 90, and assuming UE 90 is authorized, sending any new or updated presence tuples (or similar WV formatted information) of the user of WV client 86 to the X-CSCF 194 using an SIP message using the NOTIFY method on a line 350 (FIG. 16) containing presence information of the WV client 86. The SIP NOTIFY is provided by the IMS/WV Relay in response to an SSP http POST where it is converted to SIP. It is then forwarded by the X-CSCF to the packet switch and onward to the IMS terminal 90 via the RNC and BS. This conversion by the IMS/WV relay of FIG. 16 is carried out by the added functionality 119 of FIG. 5 and, in particular, by the controller 126 and the WV-to-IMS mapper 122. The controller 126 first determines in a step 5A-14 of FIG. 5A whether an SSP subscribe presence response has been received or not. If so, a transition is made to the procedure of FIG. 5G, where the WV-to-IMS mapper 122 will carry out steps 5G-2 and 5G-4 in first converting in step 5G-2 the SSP subscribe presence response to an SIP "NOTIFY" method with the presence information of the WV user included therein. The WV-to-IMS mapper 122 will then forward the SIP NOTIFY method to the IMS X-CSCF 194, as indicated in step 5G-4.

Since the presence information of the WV client is not of the same format as the IMS presence information, according to the present invention, this presence information is formatted at the IMS-WV relay into "tuples" structure and it is conveyed to the UE 90 from the X-CSCF 194 using the NOTIFY method (and as shown in detail by a reference numeral 2a in FIG. 16). In the case of the subscribe presence response shown in FIG. 16, the WV/IMS relay or its equivalent has to perform a mapping functionality between SSP and SIP. The IMS/WV relay changes the transport protocol and converts the presence information included in the WV primitive into an IMS presence data format that uses "tuples" as data structure. The extracted information is extracted from the body of the SSP primitive and contains WV formatted presence data according to WV specs that has to be mappable to the presence tuples and other formatting of IMS. In case that no direct mapping can be performed, the IMS-WV relay will store the WV presence data structure into web server and will convey the URL into the NOTIFY message. The IMS terminal can access the presence information using HTTP with the URL included in the NOTIFY. Nevertheless, the preferred solution is to perform the mapping and convey the presence information in "tuples" structure to the IMS terminal in the NOTIFY message. Therefore, the SIP NOTIFY method that is sent to the IMS terminal will contain the presence information in tuples or point to a URL from where user A at terminal 90 can fetch the presence information of the WV user of terminal 86 stored in a format that is readable by user A, e.g., converting WV format to HTML.

Figure 5H:
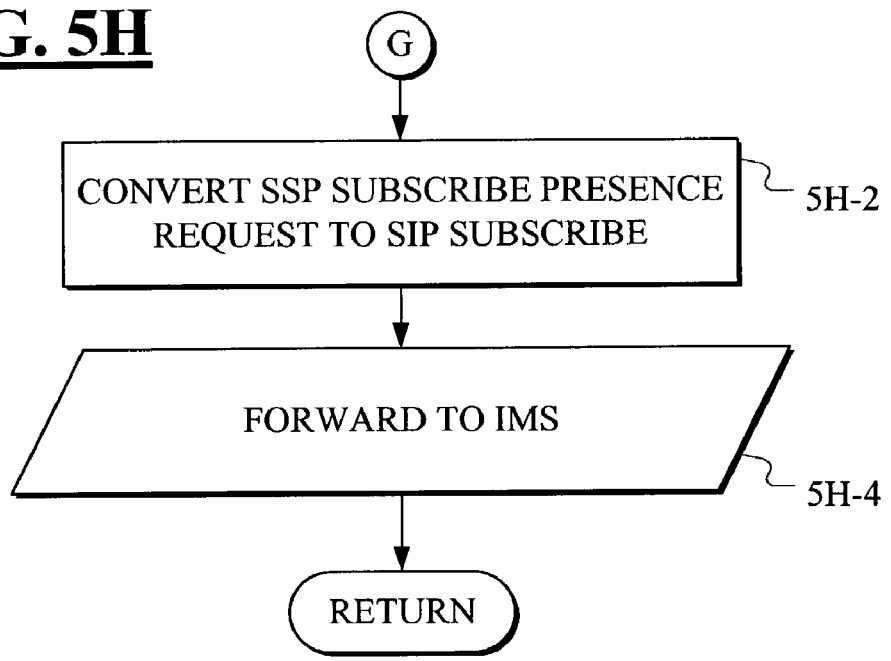
FIG. 5H shows an SSP subscribe presence request converted to an SIP subscribe and forwarded to the IMS.
Figure 17:
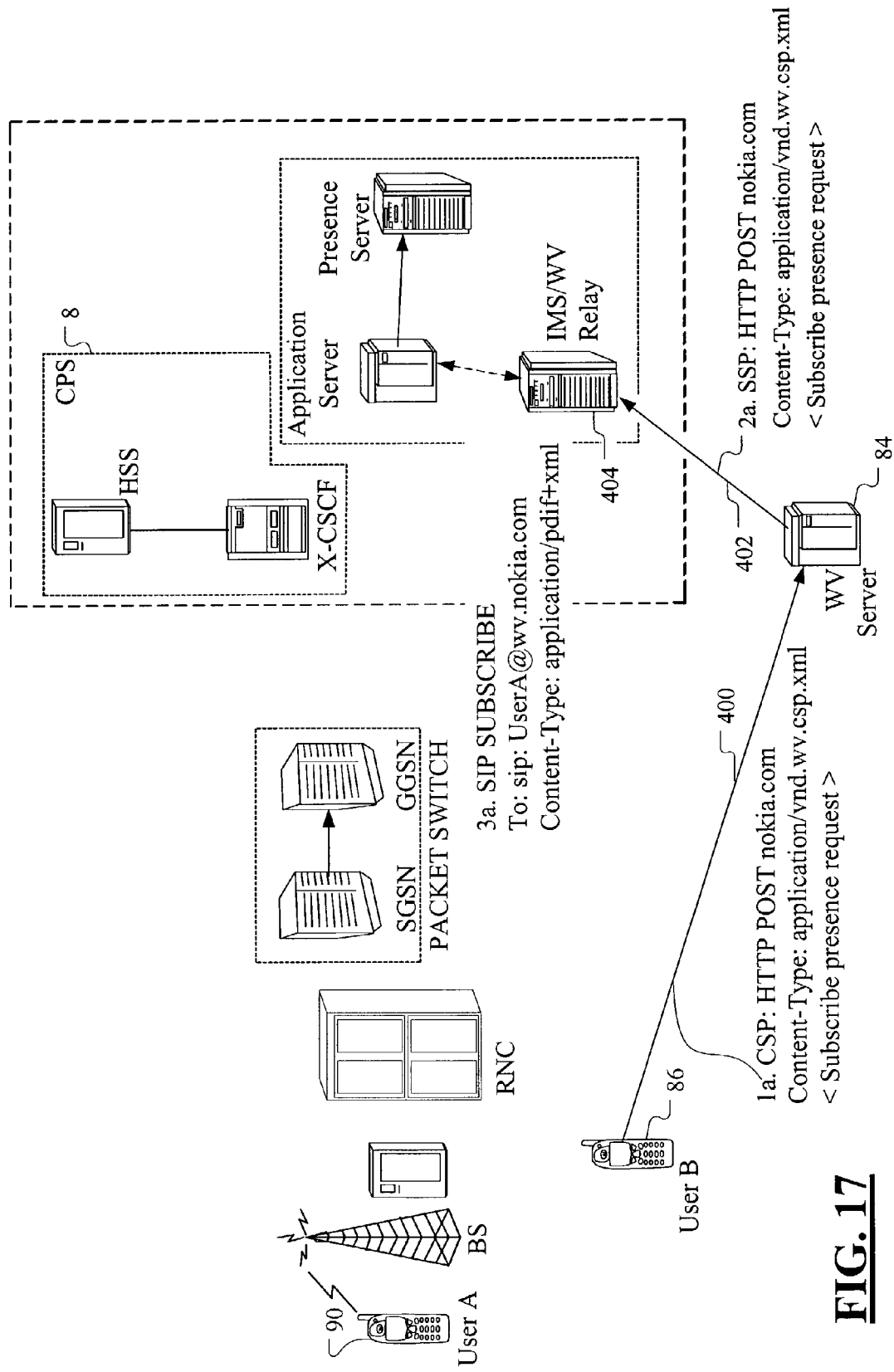
FIG. 17 shows a WV terminal subscribing to an IMS terminal's presence information, according to the present invention.
Figure 19:
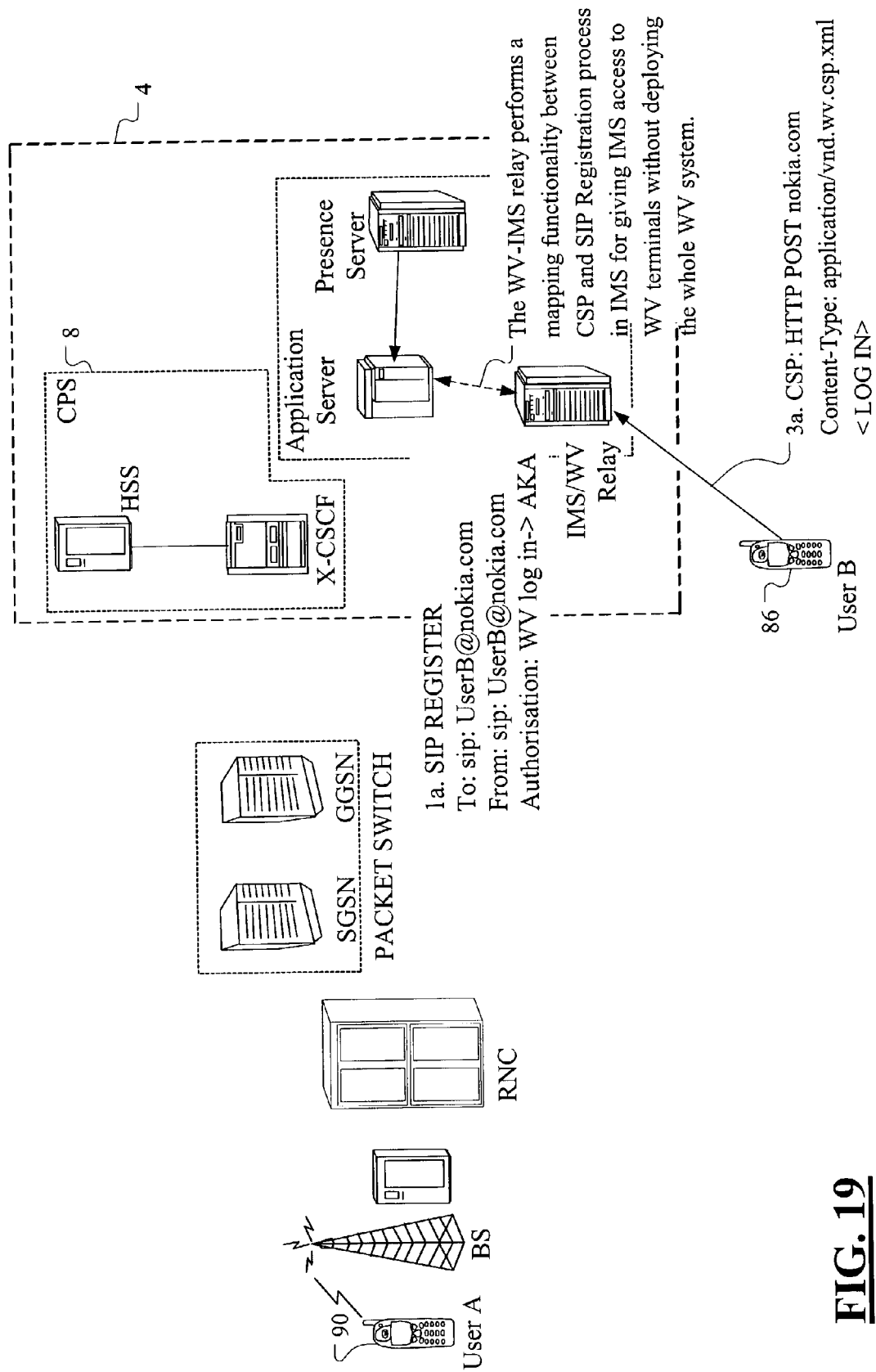
FIG. 19, like FIG. 9, also shows a WV terminal subscribing to presence information of an IMS terminal wherein the added functionality of the present invention is resident in the IMS/WV relay which performs a mapping functionality between CSP and SIP Registration process in IMS for giving IMS access to WV terminals without deploying the whole WV system

In FIG. 17, the WV terminal 86 subscribes to presence information of a user of the IMS terminal 90. In other words, FIG. 17 illustrates the reverse situation from FIG. 15. In this case, the WV client 86 has already logged in to the SAP of the WV server 84. The WV client 86 naturally does so with its own client ID and password. This is different from the login procedure of IMS, as previously explained. Using the added functionality 119 provided according to the present invention, the WV terminal could instead log using CPS directly into the IMS-WV relay (see FIG. 19), which converts the CSP log in into an SIP message in the form of a REGISTER method containing the login information provided by the WV client 86 as well as the additional functionality required by IMS including IMS authentication procedures based on AKA. As mentioned previously, this functionality can be added to as part of the IMS systems for allowing IMS access to WV terminals when the user has not deployed WV system and then there is no WV SAP available to perform the normal WV log in procedure. Referring back to FIG. 17, the subscribe presence request signal may be provided on a line 400 from the WV client 86 to the WV SAP 84. The SAP in WV server 84 sends an SSP message as indicated by a signal on a line 402 to the IMS/WV relay 404. The IMS/WV relay 404 performs the mapping functionality between the SSP and SIP SUBSCRIBE. It does this using, for instance, a step 5A-16, as shown in FIG. 5A in the controller 126 of FIG. 5 by determining if an SSP subscribe presence request has been received on the line 402 of FIG. 17. If so, a transition is made to the routine of FIG. 5H, which is carried out in the WV-to-IMS mapper 122 of FIG. 5. There, a step 5H-2 is carried out to convert the SSP subscribe presence request to an SIP subscribe method, such as shown in FIG. 17 at reference numeral 3a, and which is forwarded from the IMS/WV relay 404 to the, for instance, application server of FIG. 17 and from there to the presence server, as indicated in the step 5H-4 of FIG. 5H. A return is then made. Since the SIP format is used, in this case the application server recognizes the SUBSCRIBE message and subscribed the WV client 86 using the IMS procedures to the presence of the destination IMS user.

Figure 5I:
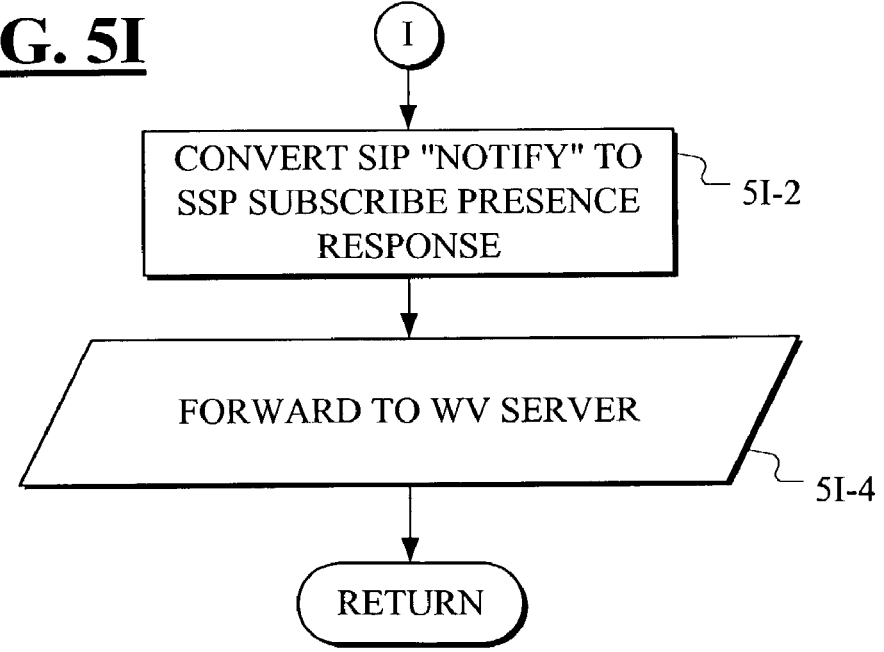
FIG. 5I shows an SIP NOTIFY converted to an SSP subscribe presence response and forwarded to a WV server.
Figure 18:
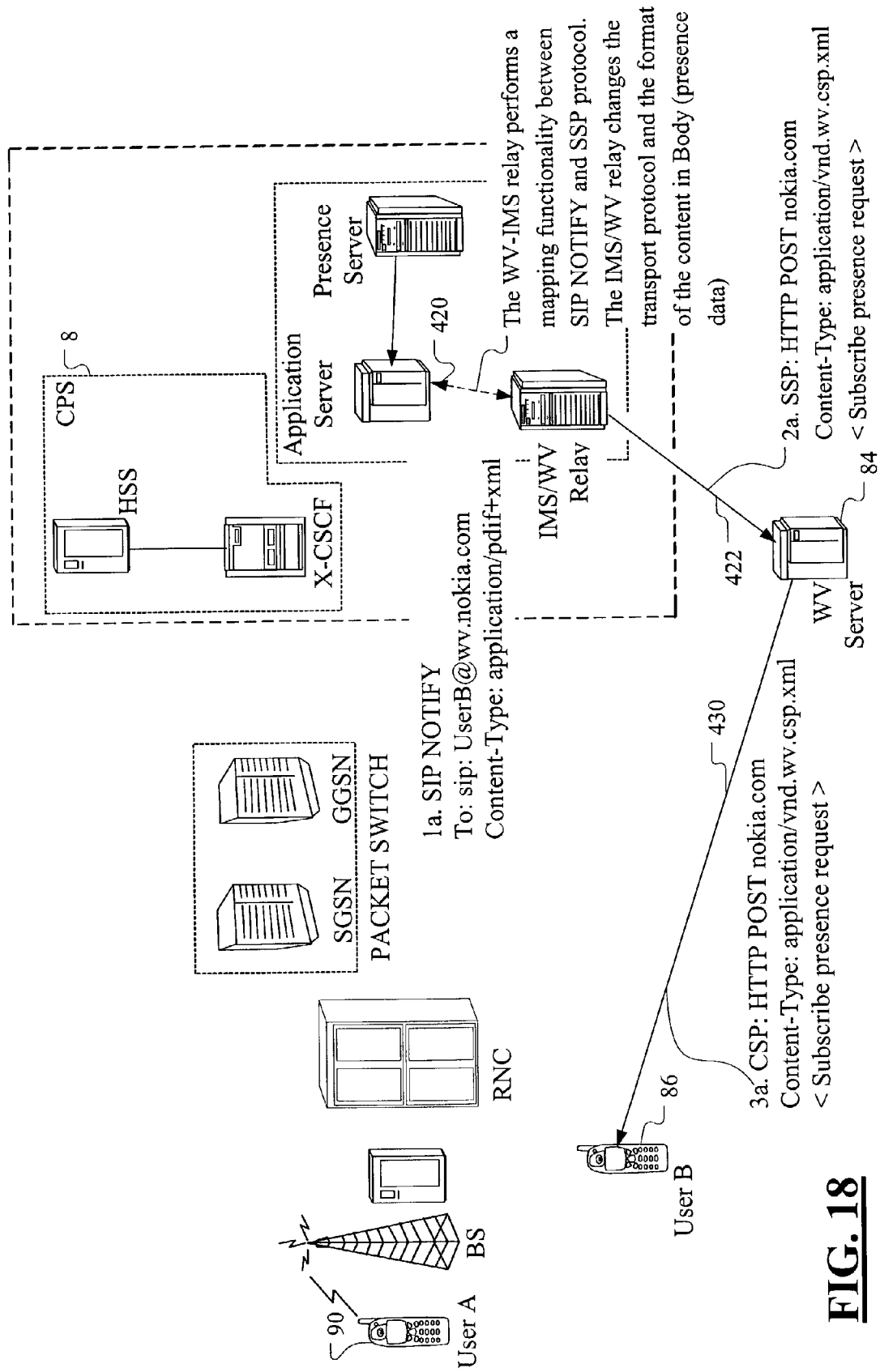
FIG. 18 shows a WV terminal that after subscribing to an IMS terminal's presence information, the presence information of the IMS terminal is sent to the WV-IMS relay that converts from SIP transport (NOTIFY) into an SSP presence delivery message according to the present invention. The WV-IMS relay also converts the IMS presence data into WV presence format and sends the presence response to the WV server that receives the presence delivers it to the WV terminal.

As shown in FIG. 18, an SIP NOTIFY method is then provided on a line 420 (see reference numeral 1a) in order to send IMS presence information of the IMS terminal 90 from the presence server via the application server to the IMS/WV Relay where it is converted (see FIG. 18) to SSP, a form (see reference numeral 2a) utilizable by the WV server 84 (or in the IMS/WV relay of FIG. 18). This converted presence information is then converted again, but to CSP and conveyed on a line 430 from the WV Server 84 to the WV client 86. The IMS/WV relay of FIG. 18 includes the added functionality 119 of FIG. 5 and is able to perform a step 5A-18 of FIG. 5A to determine if an SIP "notify" has been received. This is carried out in the controller 126 of FIG. 5. If so, the controller 126 signals the WV-to-IMS mapper 122 using the signal on the line 128 to indicate that the mapper 122 should carry out the steps 5I-2 and 5I-4 of FIG. 5I. In those steps, the SIP notify is first converted in the step 5A-2 to the SIP subscriber presence response, as shown at the reference numeral 2A of FIG. 18 and is then provided according to the step 51-4 on the line 422, by which it is forwarded to the WV server 84. The WV server then converts the presence information of the user A from the SSP to the CSP and forwards the presence information on the signal line 430 to the WV terminal 86 for use by user B.

Some mapping examples of transactions between SIP and WV are the following:

| WV Primitive | SIP primitive | Semantics |
|---|---|---|
| SubscribeRequest | SUBSCRIBE | This include "Presence-Attribute-List" in primitive, which if it is empty means that user subscribes all presence attributes = Filtering mechanism in PMG |
| AuthorizationRequest | No match. Candidate = SUBSCRIBE | This primitive is used for the server to perform the reactive authorization ≠ No match with PMG. In PMG it is based on policy and this will require to trigger similar request in PMG using SUBSCRIBE |
| AuthorizationResponse | No match. Candidate = 200 OK | This primitive returns the authorization result from the responding authorizing users. ≠ No match with PMG. In PMG it is based on policy. |
| UnsubscribeRequest | SUBSCRIBE | This primitive is used to cancel the current subscription = SIP SUBSCRIBE method with Expires = 0. |
| PresenceNotification | NOTIFY | This primitive to send the notifications about changes of presence information = SIP NOTIFY method. This primitive contains "Presence-Value-List" that is the structure including the presence attributes and this should be formatted in the appropriate structures (WV XML DTD or PMG tuples). This primitive also contains "Presence-Value-Version", which indicates the current version of the presence information; this value can be used in next request to get delta changes in presence information. Similar mechanism is proposed in PMG to implement partial notifications |
| GetWatcherListRequest | SUBSCRIBE | This primitive to retrieve the list of users that subscribed to its presence information = SIP SUBSCRIBE method with "Event=presence.winfo" |
| GetWatcherListResponse | NOTIFY | This primitive to return the subscriber list to the requestor server = SIP NOTIFY method. This primitive contain "User-ID-List" that includes the list of watchers, |
| GetPresenceRequest | SUBSCRIBE | this should be mapped into the pdif format for watchers lists. This primitive is used for the server to retrieve the updated presence information = SIP SUBSCRIBE method the ClientID used to get the presence information. This includes "Presence-Attribute-List" that would be equivalent to the filters in PMG and "Presence-Value-Version-List" that is proposed in PMG as well. |
| GetPresenceResponse | NOTIFY | This primitive is used for the server to send the updated presence information = SIP NOTIFY method.This primitive includes "Presence-Value-List" that contains the presence attributes values, which would be required to map into PMG tuples. The "Presence-Value-Version-List" proposed also in PMG. |
| SendMessageRequest | MESSAGE | This primitive is used for the client to send a message to another user. |
| SendMessageResponse | 200 OK | This primitive is used for the server to acknowledge the reception of the message. |
| NewMessage | MESSAGE | This primitive is used for the server to send message to the client from another user. |
| MessageDelivered | 200 OK | This primitive is used for the client to acknowledge the reception of the message. |

Other scenarios that can be applied to presence and messaging routing would be the following.

1) user@sonera.fi used as an identity and it is valid IMS identity Normal IMS routing to the target network i.e. UE -->P-CSCF-->S-CSCF-->I-CSCF (HSS query) -->S-CSCF-->to PMGserver if SUBSCRIBE; or to P-CSCF-->UE if instant message 2) user@sonera.fi used as an identity and it isn't valid IMS identity
   a) UE-->P-CSCF-->S-CSCF-->I-CSCF (HSS query: not found)
   b) Error response to S-CSCF
   c) Therefore a normal registration of WV terminals is needed so that Filtering Criteria (FC) can be used here again.
   d) Messages with Method=SUBSCRIBE AND Event=Presence as well as Method=MESSAGE are routed to PMG server.
   e) If Method=MESSAGE, PMG server decides whether we have SMS (contains only text and Length<=160 characters) or MMS message (otherwise), and routes the MESSAGE further to (gateway towards) the SMSC or MMSC respectively.
   f) If Method=SUBSCRIBE, PMG server routes the message further to (gateway towards) an own WV SAP server that routes it further to target network where it is routed to the target user.

3) E.164 used as an identity and it is valid IMS identity Normal IMS routing to the target network i.e. UE →P-CSCF →S-CSCF (ENUM-DNS query)→I-CSCF (HSS query)→S-CSCF→to PMGserver if SUBSCRIBE; or to P-CSCF→UE if instant message 4) E.164 used as an identity and it isn't valid IMS identity a) UE→P-CSCF→S-CSCF b) ENUM-DNS query, no response i.e. not an IMS identity c) Continues like d) e) f) under 2)

Telephony Numbering Mapping (ENUM) is used for E.164 addressing plan-based Numbers and is a service that allows users to have only one single phone number on their business card. See pages 21-22 of "Internet Communications Using SIP" by Henry Sinnreich et al, Wiley 2001. According to Sinnreich et al, the ENUM user may have multiple PSTNs, mobile and PBX phone and fax numbers, both at home, at work, and in vehicles and also several IP devices such as PCs, laptops, and palm computers, as well as pagers. ENUM can use the domain name system (DNS) in combination with SIP user preferences, so if someone uses the single number on the business card, the call, page, voice mail, or email can be directed to the device of preference of the called party. Further according to Sinnreich et al, using a single telephone number to be reached anywhere is a valid concept at present, since most phone calls originate on circuit-switched networks, using PSTN or PBX-type telephones. This may change in the future as communications over the Internet gain user acceptance and a single contact address in the form of a URL, like an e-mail address, may become the more practical choice.

Figure 20:
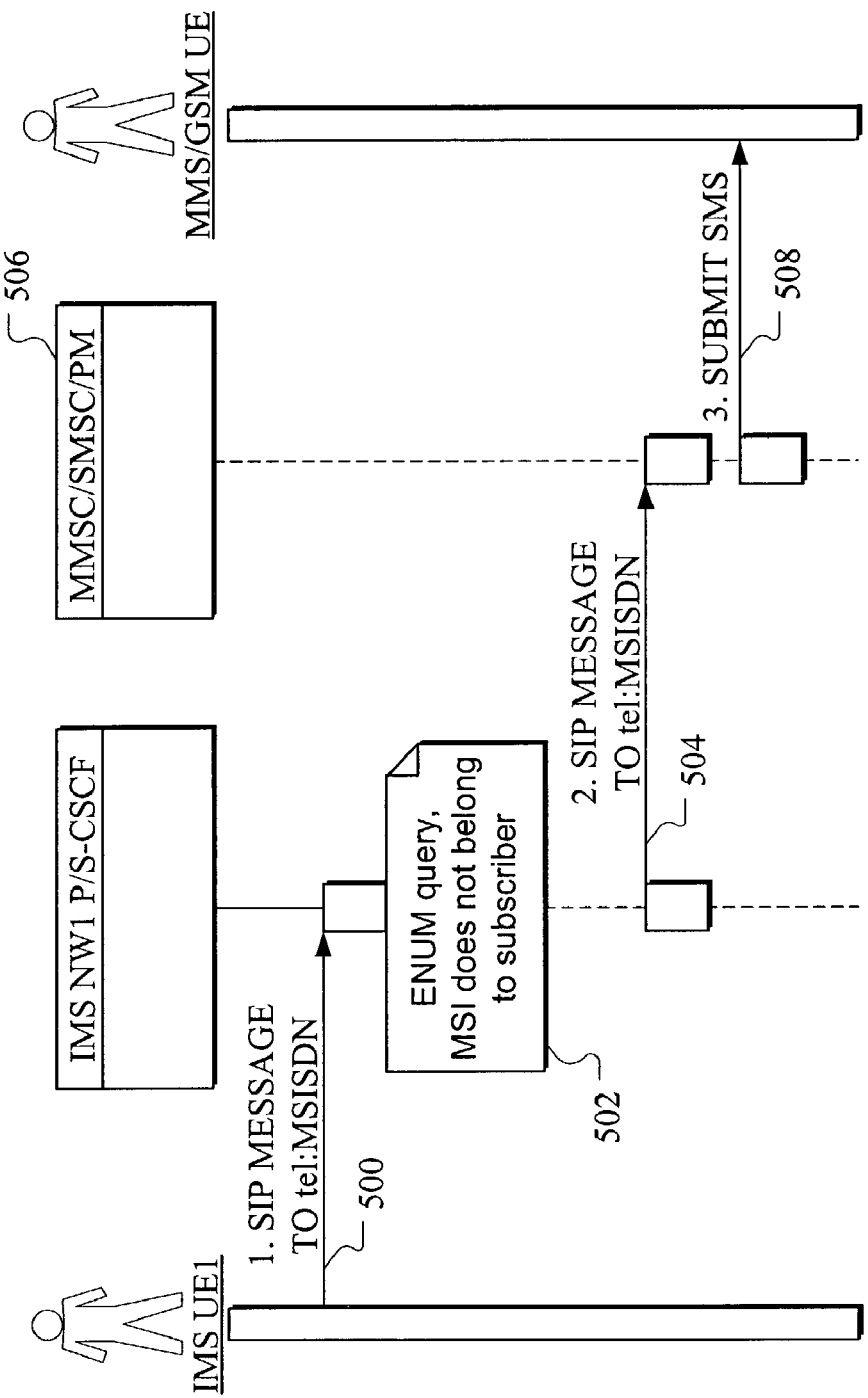
FIG. 20 shows a message sent from an IMS terminal using MSISDN followed by an ENUM query at the IMS Proxy/Serving-CSCF and an SIP message sent to an MMSC/SMSC/PMG and from there an SMS to an MMS/GSM User.

In the following scenario, as shown in FIG. 20, the message is sent on a signal line 500 from an IMS terminal using MSISDN and the normal procedure is as indicated in the figure. I.e., the IMS NW1 P/S-CSCF (Proxy/Serving-CSCF) performs an ENUM (E.164 addressing plan based NUMbers) query as indicated at a step 502 and determines that the subscriber does or does not belong to an ENUM service.

If the IMS user of UE1 is authorized, the SIP message is provided from the IMS (P/S-CSCF on a line 504 to an MMSC, an SMSC, or a PM, depending on the nature of the message, i.e., whether it is a multimedia message, or a short message or an SIP message. Assuming it is an SMS message, the SIP message on the line 504 is forwarded to an SMSC 506 and from there to the intended user as indicted on a line 508.

There are other possibilities:

1) ENUM-DNS can be utilized by making a NAPTR query and getting "wv: 2233445@domain" as result. Now there is a problem as to how this is routed. It cannot be routed to I-CSCF because it is not an IMS identity (see Appendix about ENUM).

a) If there is a WV gateway (or WV SAP) acting as AS in IMS, it can be routed there.

b) If there isn't it can be routed to a PMG server that routes it further to a WV SAP.

2) Same as 1) but we get wv:2233445 as result. This is local WV identity. Routing as in 1).

These scenarios are not very useful because E.164 could be used also as an MMS address and then attaching wv: in front of it would make it non valid MMS address.

Chat/Conferencing

In the above-mentioned WV specifications, the Group Service Element 32 (FIG. 2) provides functionality for use and management of groups. The groups can be private or public. A common usage of the Group Service is a chat room. It is also possible to bind content to the Groups. The Content Service Element 34 provides functionality for sharing content such as images and documents between Wireless Village users.

In terms of interoperability for managing the groups from different terminals, it is required to have a common Group ID that uniquely identifies the group. The group address should be compliant with "username@hostport" address type to be able to use it from different domains. Nevertheless, the group management requires its own protocol that can handle the group management primitives with the appropriate semantics.

Once the group is created the group can be used independently from any domain. This requires that the specific application server that accesses the group information can interpret the queries for the group and translate them into the appropriate group management primitives towards the group server. (E.g. A group is created in a WV server and its address is used for initiating a SIP conferencing. Thus, the SIP conference server based on the Group ID should be able to retrieve and interpret the group information from the WV server to use it in the SIP conferencing).

APPENDIX

ENUM Service

The problem is how to route to many services with the same identity, where the identity may be; logical name or E.164.

The DNS has SRV RR i.e. resource record (RFC2782) and TR RR (RFC2915). The idea of using SRV consists in clients asking for a specific service/protocol for a specific domain and getting back the names of any available servers each SRV RR specifies both the protocol and the service. The DNS query is done asking SRV RR with the following domain name "_service._protocol.ims_domain".

944-004.012

The E.164 is translated to a FQDN with ENUM.
If client receives +358-40-1122334 the procedure is as follows:
1) E.164 is converted to a domain name: 4.3.3.2.2.1.1.4.0.8.5.3.e164.operator_domain 2) DNS query is done with the domain name asking NAPTR RR and the result could be the following:
$ORIGIN 4.3.3.2.2.1.1.0.4.8.5.3.e164.operator_domain
 IN NAPTR 100 10 "u" "sip+E2U" "!(^.$)!sip:\1@ims.sonera.fi!"

3) Continuation with ims.sonera.fi like normal DNS query asking SRV RR with the following argument:
"_service._protocol.ims.sonera.fi"

In the case of using WV addresses, NAPTR RR with "u" can probably be used to convert addresses from sip to wv address and vice versa.
If client receives +358-40-1122334 the procedure would be as follows:
1) E.164 is converted to a domain:
4.3.3.2.2.1.1.4.0.8.5.3.e164.operator_domain 2) DNS query is done with the domain name asking NAPTR RR the result could be the following:
$ORIGIN 4.3.3.2.2.1.1.0.4.8.5.3.e164.operator_domain
 IN NAPTR 100 10 "u" "ims+E2U" "!(^.$)!ims:\1@ims.sonera.fi!" .
 IN NAPTR 100 10 "u" "wv+E2U" "!(^.$)!wv:\1@ims.sonera.fi!"

3) Because we look after WV service, we choose wv+E2U line the result would be the following
wv:358-40-1122334@ims.sonera.fi if the identity is not an E.164 the following address is build adding wv as prefix
wv:subscriber@ims.sonera.fi 4) DNS query is done asking NAPTR RR using the prefix wv and the domain part of the result:
wv.ims.sonera.fi
the result could be the following
 IN NAPTR 100 10 "s" "sip+bigmessage" "" _message._tcp.wv.ims.sonera.fi
 IN NAPTR 100 10 "s" "sip+message"    "" _message._udp.wv.ims.sonera.fi
 IN NAPTR 100 10 "s" "sip+presence"   "" _presence._udp.wv.ims.sonera.fi
 IN NAPTR 100 10 "s" "sip+group"      "" _group._udp.wv.ims.sonera.fi 5) Because order and preference fields are equal, any of the RRs can be chosen. We are sending a short message, so we chose the second one. Flag "s" tells that the next DNS query is done asking SRV RR.

6) DNS query is done asking SRV RR with the domain name:
_message._udp.wv.ims.sonera.fi
the result could be the following
_message._udp.wv.ims.sonera.fi. IN SRV 0 0 9999 wv-message.wv.ims.sonera.fi
                                IN SRV 1 0 9999 wv-message-old.wv.ims.sonera.fi
7) DNS query is done asking A RR with the domain name:
wv-message.wv.ims.sonera.fi
Finally the result would be an IP address.

Examples of DNS queries:
```
$ORIGIN ims.sonera.fi.
; load sharing is done between the following two servers
; having highest priority i.e. 0
```

```
; 1/4 of the load is directed to the first server
; 3/4 to the second server.
; Target port is 5060. Protocol is UDP.
_chat._udp      SRV 0 1 5060 chat_srv_old.ims.sonera.fi.
SRV 0 3 5060 chat_srv_new.ims.sonera.fi.
; if neither of these servers is up, switch to one of the
; following
SRV 1 0 5060 chat_srv_back1.ims.sonera.fi.
SRV 1 0 5060 chat_srv_back2.ims.sonera.fi.
chat_srv_back1   A   172.30.79.10
chat_srv_back2   A   172.30.79.11
chat_srv_old     A   172.30.79.12
chat_srv_new     A   172.30.79.13

; Let's set up message service SRV RRs the same way
; Load is shared equally between the following two servers.
; Target port is 5060. Protocol is UDP for short messages.
_message._udp   SRV 0 0 5060 message_srv1.ims.sonera.fi.
        SRV 0 0 5060 message_srv2.ims.sonera.fi.
message_srv1    A   172.30.79.14
message_srv2    A   172.30.79.15

; Let's set up BIG message service SRV RRs the same way
; Load is shared equally between the following two servers.
; Target port is 5060. Protocol is TCP for big messages.
_bigmessage._tcp SRV 0 0 5060 bigmessage_srv1.ims.sonera.fi.
        SRV 0 0 5060 bigmessage_srv2.ims.sonera.fi.
bigmessage_srv1  A   172.30.79.14
bigmessage_srv2  A   172.30.79.15
; Let's set up presence service SRV RRs the same way
; Load is shared equally between the following three servers.
; Target port is 5060. Protocol is TCP.
_presence._udp  SRV 0 0 5060 presence_srv1.ims.sonera.fi.
        SRV 0 0 5060 presence_srv2.ims.sonera.fi.
; if neither of these servers is up, switch to the following
        SRV 1 0 5060 announcement_srv.ims.sonera.fi.
presence_srv1   A   172.30.79.16
presence_srv2   A   172.30.79.17
announcemnt_srv A   172.30.79.18
; NO other services are supported for this domain with
; protocols TCP and UDP
*._tcp          SRV  0 0 0 .
*._udp          SRV  0 0 0 .
```

The invention claimed is:

1. A method, comprising:

converting a register signal received according to a first protocol of a first network from a first device to a third protocol without using a first server of said first network, for providing a login request signal according to said third protocol for registering said first device of said first network in a second network using a second protocol so that said first device is then available for communication with a second device of said second network, converting a presence request signal received according to said first protocol from said first server to said second protocol for requesting presence information of said second device from a second server of said second network according to a subscription to said presence information of said second device subscribed by said first device, and converting a presence information signal according to said second protocol indicative of said presence information of said second device and received from said second server to said first protocol for transmission to said first server and onward to said first device.

2. The method of claim 1, further comprising:

converting a log in signal received from said second server or directly from said second device according to said second protocol to said first protocol for registering said second device designed for use in said second network in said first network, and converting to said second protocol a message request signal received according to said first protocol from said first server in communication according to said first protocol with said first device for transmission of said message request signal according to said second protocol to said second server for conversion to said third protocol at said second server for transmission of said message request to said second device according to said third protocol.

3. A method comprising:

converting a register signal received from a second device of a second network according to a third protocol to a first protocol without using a second server of said second network, for providing a login request signal according to said first protocol for registering said second device in a first network using said first protocol so that said second device is then available for communication with a first device of said first network, converting a presence request signal received according to a second protocol from said second server of said second network to said first protocol for requesting presence information of said first device from a first server of said first network according to a subscription to said presence information of said first device subscribed by said second device, and converting a presence information signal according to said first protocol indicative of said presence information of said first device and received from said first server to said second protocol for transmission to said second server for conversion to said third protocol at said second server for transmission to said second device.

4. A method comprising:

converting a register signal received from a second device of a second network according to a third protocol to a first protocol of a first network without using a second server of said second network, for providing a login request signal according to said first protocol for registering said second device in said first network so that said second device is then available for communication with a first device of said first network, converting a presence request signal received according to said first protocol from a first server of said first network to said third protocol for requesting presence information of said second device according to a subscription to said presence information of said second device subscribed by said first device, and converting to said first protocol a presence information signal according to said third protocol indicative of said presence information of said second device and received from said second device for transmission to said first server and onward to said first device.

5. A method comprising:

converting a register signal received from a second device of a second network according to a third protocol to a first protocol of a first network without using a second server of said second network for providing a login request signal according to said first protocol for registering said second device designed for use in said second network in said first network so that said second device is then available for communication with a first device of said first network, converting to said first protocol a presence request signal received according to a second protocol of said second network from said second server or received according to said third protocol from said second device for requesting presence information of said first device from a first server of said first network according to a subscription to said presence information of said first device subscribed by said second device, and converting to said third protocol a presence information signal received according to said first protocol from said first server indicative of said presence information of said first device to said third protocol for transmission to said second device or converting said presence information signal to said second protocol for transmission to said second server for conversion to said third protocol at said second server for transmission to said second device.

6. An apparatus comprising:

first converter, responsive to an incoming first register signal from a first device in a first network, said first register signal provided according to a format of a first protocol wherein said first network uses said format of said first protocol to register devices in the first network and also responsive to a first control signal, for providing a first converted signal according to a format of a second protocol for registering said first device of said first network in a second network that uses said format of said second protocol to register devices in the second network; and a control, responsive to said incoming first register signal, for providing said first control signal;

wherein said first converter is responsive to a presence request signal received according to said second protocol from a server of said second network and to said first control signal for converting said presence request signal received according to said second protocol from said server of said second network to said first protocol for requesting presence information of said first device from a server of said first network, according to a subscription to said presence information of said first device subscribed by said second device, wherein said control is responsive to said presence request signal for providing said first control signal.

7. The apparatus of claim 6, further comprising:
second converter, responsive to an incoming message request signal received according to said second protocol from a second device and responsive to a second control signal, for providing a converted message request signal according to said first protocol for transmission of said message request signal according to said first protocol to said first device, wherein said control is responsive to said incoming message request signal, for providing said second control signal.

8. The apparatus of claim 7, wherein said second converter is responsive to a second register signal received from a server of said second network according to said second protocol and is responsive to said second control signal from said control, for converting said second register signal received from said server to a second register signal according to said first protocol for registering said second device of said second network in said first network, wherein said control is responsive to said second register signal for providing said second control signal and wherein said server of said second network is in communication with said second device either via another server or directly.

9. The apparatus of claim 8, wherein said first converter is responsive to an incoming second message request signal received according to said first protocol from a server of said first network in communication according to said first protocol with said first device and responsive to said first control signal, for converting said second message request signal received according to said first protocol to an outgoing second message request signal according to said second protocol for transmission to said server of said second network for conversion to said third protocol at said second server for transmission to said second device, wherein said control is responsive to said incoming second message request signal, for providing said first control signal.

10. The apparatus of claim 9, wherein said first converter is responsive to a presence request signal received according to said first protocol from said server of said first network and to said first control signal, for converting said presence request signal to said second protocol for requesting presence information of said second device from said server of said second network according to a subscription to said presence information of said second device subscribed by said first device.

11. The apparatus of claim 10, wherein said second converter is responsive to a presence information signal according to said second protocol indicative of presence information of said second device and received from said server of said second network and is responsive to said second control signal provided by said control in response to said presence information signal according to said second protocol for conversion to said first protocol for transmission to said server of said first network and onward to said first device.

12. The apparatus of claim 7, wherein said second converter is responsive to a register signal received from said server of said second network according to said second protocol and is responsive to said second control signal from said control, for converting said register signal received from said server of said second network to a register signal according to said first protocol for registering said second device of said second network in said first network, wherein said control is responsive to said register signal for providing said second control signal.

13. The apparatus of claim 6, wherein said first converter is responsive to a presence information signal according to said first protocol indicative of said presence information of said first device and received from said server of said first network and responsive to said first control signal, for converting said presence information signal received from said server of said first network to said second protocol for transmission to said server of said second network for conversion to said third protocol at said server of said second network for transmission to said second device, wherein said control is responsive to said presence information signal for providing said first control signal.

14. A device comprising:
means for converting a login request signal received from a second device of a second network according to a third protocol of said second network or from a second server of said second network according to a second protocol of said second network to a first protocol of a first network for registering said second device of said second network in said first network,
means for converting a presence request signal received according to said third protocol from said second server to said first protocol for requesting presence information of a first device of said first network from a first server of said first network according to a subscription to said presence information of said first device subscribed by said second device, and
means for converting a presence information signal according to said first protocol indicative of said presence information of said first device and received from said first server to said third protocol for transmission to said second server and onward to said second device.

15. A device comprising:
means for converting a login request signal received from a second server of a second network according to a second protocol of said second network to a first protocol of a first network for registering a second device of said second network in said first network,
means for converting a presence request signal received according to said first protocol from a first server of said first network to said second protocol for requesting presence information of said second device from said second server according to a subscription to said presence information of said second device subscribed by a first device of said first network, and
means for converting a presence information signal according to said second protocol indicative of said presence information of said second device and received from said second server to said first protocol for transmission to said first server and onward to said first device.

16. A device comprising:
means for converting a login request signal received from a second server of a second network according to a second protocol of said second network to a first protocol of a first network for registering a second device of said second network in said first network,
means for converting a presence request signal received according to said second protocol from said second server to said first protocol for requesting presence information of a first device of said first network from a first server of said first network according to a subscription to said presence information of said first device subscribed by said second device, and
means for converting a presence information signal according to said first protocol indicative of said presence information of said first device and received from said first server to said second protocol for transmission to said second server for conversion to a third protocol at said second server for transmission to said second device.

* * * * *